US009131092B2

(12) United States Patent
Ito

(10) Patent No.: US 9,131,092 B2
(45) Date of Patent: Sep. 8, 2015

(54) IMAGE READING DEVICE

(71) Applicant: Tetsuo Ito, Nagoya (JP)

(72) Inventor: Tetsuo Ito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/105,961

(22) Filed: Dec. 13, 2013

(65) Prior Publication Data

US 2014/0167353 A1 Jun. 19, 2014

(30) Foreign Application Priority Data

Dec. 14, 2012 (JP) ................................ 2012-273397
Oct. 8, 2013 (JP) ................................ 2013-211004

(51) Int. Cl.

*B65H 9/00* (2006.01)
*H04N 1/00* (2006.01)
*B65H 9/08* (2006.01)
*H04N 1/04* (2006.01)
*H04N 1/10* (2006.01)
*H04N 1/12* (2006.01)
*H04N 1/203* (2006.01)

(52) U.S. Cl.

CPC .............. *H04N 1/00554* (2013.01); *B65H 9/08* (2013.01); *B65H 2402/31* (2013.01); *B65H 2402/32* (2013.01); *B65H 2404/1381* (2013.01); *H04N 1/0464* (2013.01); *H04N 1/1013* (2013.01); *H04N 1/12* (2013.01); *H04N 1/2032* (2013.01); *H04N 2201/0094* (2013.01); *H04N 2201/0434* (2013.01)

(58) Field of Classification Search

CPC ................... B65H 2404/1381; B65H 2402/31; B65H 2402/32; B65H 9/08; B65H 2402/441
USPC .............................................................. 271/1
See application file for complete search history.

(56) References Cited

U.S. PATENT DOCUMENTS

| | | | | |
|---|---|---|---|---|
| 4,660,251 | A * | 4/1987 | Watabe | 16/367 |
| 5,261,634 | A * | 11/1993 | Nakamura | 248/441.1 |
| 7,855,814 | B2 * | 12/2010 | Osakabe et al. | 358/474 |
| 7,949,292 | B2 * | 5/2011 | Choi | 399/380 |
| 2005/0207810 | A1 * | 9/2005 | Fukumura | 399/367 |
| 2005/0246862 | A1 * | 11/2005 | Chen | 16/221 |
| 2010/0014127 | A1 * | 1/2010 | Osakabe et al. | 358/497 |

FOREIGN PATENT DOCUMENTS

| | | | |
|---|---|---|---|
| JP | S57-70526 | A | 5/1982 |
| JP | H09-261422 | A | 10/1997 |
| JP | 2002-244233 | A | 8/2002 |

* cited by examiner

*Primary Examiner* — Howard Sanders
(74) *Attorney, Agent, or Firm* — Banner & Witcoff, Ltd.

(57) ABSTRACT

An image reading device, including: a casing having a document placement surface on which a document is to be placed; a cover provided on the casing and configured to be pivotable relative to the casing about an axis between a covering position at which the cover covers the document support surface and an exposure position at which the document support surface is exposed; two hinges provided so as to be spaced apart from each other in an axis direction in which the axis extends, one end portion of each of the two hinges being inserted into the casing movably in a movement direction perpendicular to the document placement surface while the other end portion is connected to the cover; and a contact member configured to be capable of coming into contact with one of the two hinges in the axis direction.

13 Claims, 15 Drawing Sheets

IMAGE READING DEVICE

CROSS REFERENCE TO RELATED APPLICATION

The present application claims priority from Japanese Patent Application Nos. 2012-273397 and 2013-211004, which were filed respectively on Dec. 14, 2012 and Oct. 8, 2013, the disclosure of which is herein incorporated by reference in its entirety.

BACKGROUND OF THE INVENTION

1. Field of the Invention

The present invention relates to an image reading device.

2. Description of Related Art

A known image reading device has a casing and a cover. The cover is provided so as to be pivotable between an exposure position at which a document table provided on an upper surface of the casing is exposed and a covering position at which the cover covers the document table. In a state in which the cover is located at the exposure position, a document is placed on the document table such that an image-formed surface thereof faces the document table. Subsequently when the cover is moved from the exposure position to the covering position, the document is pressed onto the document table by a document pressing plate provided on the cover.

The cover is connected to the casing by a hinge. One end of the hinge is connected to a rear end portion of the cover through a pivot shaft that extends in a left-right direction. The hinge extends downward from the cover. A lower end portion of the hinge is supported by a hinge receiving portion provided in the casing so as to be movable in an up-down direction.

In the above arrangement, the cover can be moved from the covering position to the exposure position by lifting up a front end portion of the cover. Further, when a document with a large thickness such as a book is pressed by the cover, it is possible to lift up the cover with respect to the casing such that the cover becomes substantially parallel to the document table. Consequently, the image-formed surface of the document can be uniformly pressed onto the document table.

SUMMARY OF THE INVENTION

When the cover is moved from the covering position to the exposure position, there may be an instance in which a force is applied to a one-side part of the front end portion of the cover, which one-side part is near to one of opposite sides of the cover in the left-right direction. In this instance, the above-indicated one-side part of the cover is lifted up earlier than an other-side part of the front end portion of the cover, which other-side part is near to the other of the opposite sides of the cover in the left-right direction, and the hinge moves upward while the cover is inclined with respect to the casing. Accordingly, the lower end portion of the hinge is in sliding and rubbing contact with the hinge receiving portion of the casing, causing a risk of damaging the hinge receiving portion.

It is therefore an object of the present invention to provide an image reading device wherein, when a cover or an automatic document supply unit is moved from a covering position to an exposure position about an axis, it is possible to prevent the cover or the automatic document supply unit from inclining with respect to an axis direction in which the axis extends.

The object indicated above may be attained according to one aspect of the present invention, which provides an image reading device, comprising: a casing having a document placement surface on which a document is to be placed; a cover provided on the casing and configured to be pivotable relative to the casing about an axis between a covering position at which the cover covers the document support surface and an exposure position at which the document support surface is exposed; two hinges provided so as to be spaced apart from each other in an axis direction in which the axis extends, one end portion of each of the two hinges being inserted into the casing movably in a movement direction perpendicular to the document placement surface while the other end portion is connected to the cover; and a contact member configured to be capable of coming into contact with one of the two hinges in the axis direction.

The object indicated above may be attained according to another aspect of the present invention, which provides an image reading device, comprising: a casing having a document placement surface on which a document is to be placed; an automatic document supply unit provided on the casing and configured to be pivotable relative to the casing about an axis between a covering position at which the automatic document supply unit covers the document support surface and an exposure position at which the document support surface is exposed; two hinges provided so as to be spaced apart from each other in an axis direction in which the axis extends, one end portion of each of the two hinges being inserted into the casing movably in a movement direction perpendicular to the document placement surface while the other end portion is connected to the automatic document supply unit; and a contact member disposed on an inner side of the two hinges with respect to an arrangement of the two hinges in the axis direction, wherein the automatic document supply unit has a conveyor for conveying a document and a motor disposed at a position near to one side of the automatic document supply unit in the axis direction and configured to generate a drive force for the conveyor, and wherein the contact member has: a contact surface that is capable of coming into contact with one of the two hinges that is disposed on the one side of the automatic document supply unit; and an inclined surface that is inclined so as to get closer to the document placement surface toward the other side of the automatic document supply unit that is opposite to the one side in the axis direction.

The object indicated above may be attained according to still another aspect of the present invention, which provides an image reading device, comprising: a casing having a document placement surface on which a document is to be placed; an automatic document supply unit provided on the casing and configured to be pivotable relative to the casing about an axis between a covering position at which the automatic document supply unit covers the document support surface and an exposure position at which the document support surface is exposed; two hinges provided so as to be spaced apart from each other in an axis direction in which the axis extends, one end portion of each of the two hinges being inserted into the casing movably in a movement direction perpendicular to the document placement surface while the other end portion is connected to the automatic document supply unit; and a contact member that is disposed on an outer side of the two hinges with respect to an arrangement of the two hinges in the axis direction, wherein the automatic document supply unit has a conveyor for conveying a document and a motor disposed at a position near to one side of the automatic document supply unit in the axis direction and configured to generate a drive force for the conveyor, wherein one of the two hinges that is disposed on the one side of the automatic document supply unit has an extension that extends toward the outer side, so as to be opposed to the contact member, and wherein the contact member has: a contact surface that is capable of coming into contact with the extension; and an inclined surface that is inclined so as to get closer to the document placement surface toward the one side of the automatic document supply unit.

The object indicated above may be attained according to yet another aspect of the present invention, which provides an image reading device, comprising: a casing having a document placement surface on which a document is to be placed; an automatic document supply unit provided on the casing and configured to be pivotable relative to the casing about an axis between a covering position at which the automatic document supply unit covers the document support surface and an exposure position at which the document support surface is exposed; two hinges provided so as to be spaced apart from each other in an axis direction in which the axis extends, one end portion of each of the two hinges being inserted into the casing movably in a movement direction perpendicular to the document placement surface while the other end portion is connected to the automatic document supply unit; and a contact member that is disposed on an inner side of the two hinges with respect to an arrangement of the two hinges in the axis direction, wherein the automatic document supply unit has a conveyor for conveying a document and a motor disposed at a position near to one side of the automatic document supply unit in the axis direction and configured to generate a drive force for the conveyor, wherein one of the two hinges that is disposed on the one side of the automatic document supply unit has a protrusion that protrudes in a direction perpendicular to both of the axis direction and the movement direction, and wherein the contact member has: a contact surface that is capable of coming into contact with the protrusion; and an inclined surface that is inclined so as to get closer to the document placement surface toward the other side of the automatic document supply unit that is opposite to the one side in the axis direction.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which.

DETAILED DESCRIPTION OF THE EMBODIMENTS

There will be hereinafter explained in detail embodiments of the present invention with reference to the drawings.

<External Structure>

Figure 1:
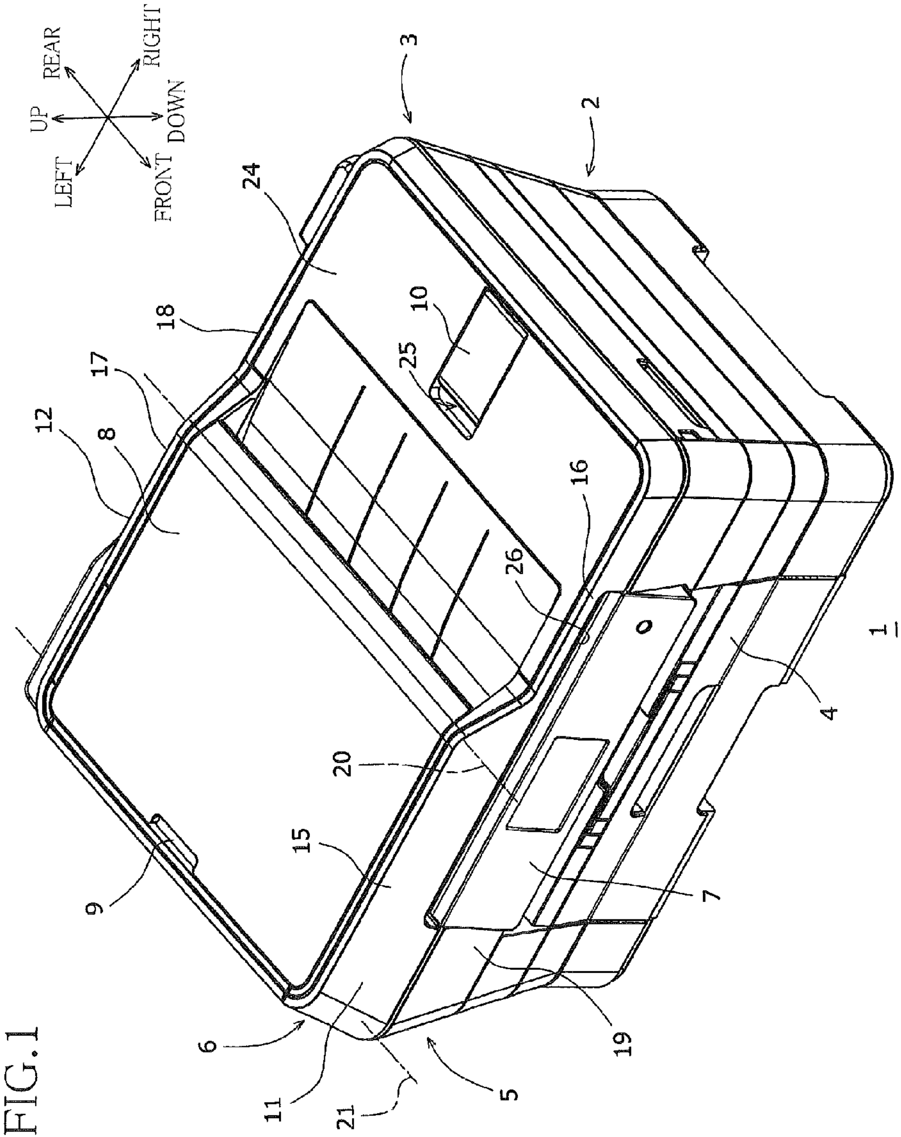
FIG. 1 is a perspective view of an MFP 1 equipped with an image reading device 3 according to a first embodiment of the invention, as viewed from a upper front right side.

As shown in FIG. 1, a Multi-Function Peripheral (MFP) 1 includes an image forming device 2 and an image reading device 3.

The image forming device 2 has a sheet supply cassette 4 in which sheets can be accommodated. The image forming device 2 may employ an ink-jet method in which an image is formed on a sheet by directly ejecting minute droplets of ink to the sheet conveyed from the sheet supply cassette 4. Alternatively, the image forming device 2 may employ an electrophotographic method in which an image is formed on the sheet by transferring and fixing a toner image onto the sheet conveyed from the sheet supply cassette 4.

The image reading device 3 includes a casing 5, an Automatic Document Feeder unit (hereinafter referred to as the "ADF unit") 6, an operation panel 7, a tray 8, a maintenance cover 9 and a stopper 10.

In the following explanation, an up-down direction, a left-right direction, and a front-rear direction are defined by regarding, as an upper side, a side of the casing 5 on which the ADF unit 6 is present and by regarding, as a front side, a side of the casing 5 on which the operation panel 7 is present with respect to the center of the casing 5 in plan view. In the drawings, the directions are indicated by arrows.

The casing 5 is one example of a casing and is disposed on an upper side of the image forming device 2.

The ADF unit 6 is one example of a cover and is one example of an automatic document supply unit. The ADF unit 6 includes a front plate 11 and a rear plate 12. The front plate 11 and the rear plate 12 are disposed so as to be spaced apart from each other in the front-rear direction. A left-side portion 15 of the front plate 11 that corresponds to about a half of the front plate 11 has a dimension in the up-down direction larger than that of a right-side portion 16 of the front plate 11 that corresponds to the rest of the front plate 11. Accordingly, an upper end of the left-side portion 15 is located at a height level higher than a height level of an upper end of the right-side portion 16. A left-side portion 17 of the rear plate 12 that corresponds to about a half of the rear plate 12 has a dimension in the up-down direction larger than that of a right-side portion 18 of the rear plate 12 that corresponds to the rest of the rear plate 12. Accordingly, an upper end of the left-side portion 17 is located at a height level higher than a height level of an upper end of the right-side portion 18. Each of the front plate 11 and the rear plate 12 is inclined such that a portion thereof nearer to the upper side is located more inward in the front-rear direction than the other portion thereof for permitting the image reading device 3 to be seen as having a compact configuration. An opening 26 is formed in the front plate 11. The opening 26 is formed by cutting, in an upward direction, a central portion, in the left-right direction, of a lower end portion of the front plate 11. When a user inserts his/her fingers into the opening 26 and the ADF unit 6 is lifted up, the ADF unit 6 pivots so as to be separated away from the casing 5.

The operation panel 7 is provided on a front face 19 of the casing 5. The operation panel 7 is operated by the user for various settings. On the operation panel 7, there is displayed information such as details of the settings.

The tray 8 is disposed so as to bridge the left-side portion 15 of the front plate 11 and the left-side portion 17 of the rear plate 12. The tray 8 is pivotable about a pivot axis 20 that extends in the front-rear direction between an upper right end portion of the left-side portion 15 and an upper right end portion of the left-side portion 17, such that the tray 8 is selectively located at one of a covering position shown in FIG. 1 and a tray position shown in FIG. 2. When the tray 8 is located at the covering position, the tray 8 extends along upper edges of the left-side portions 15, 17 so as to overlie the maintenance cover 9. When the tray 8 is located at the tray position, the tray 8 extends from right ends of the left-side portions 15, 17 toward the upper right.

Figure 2:
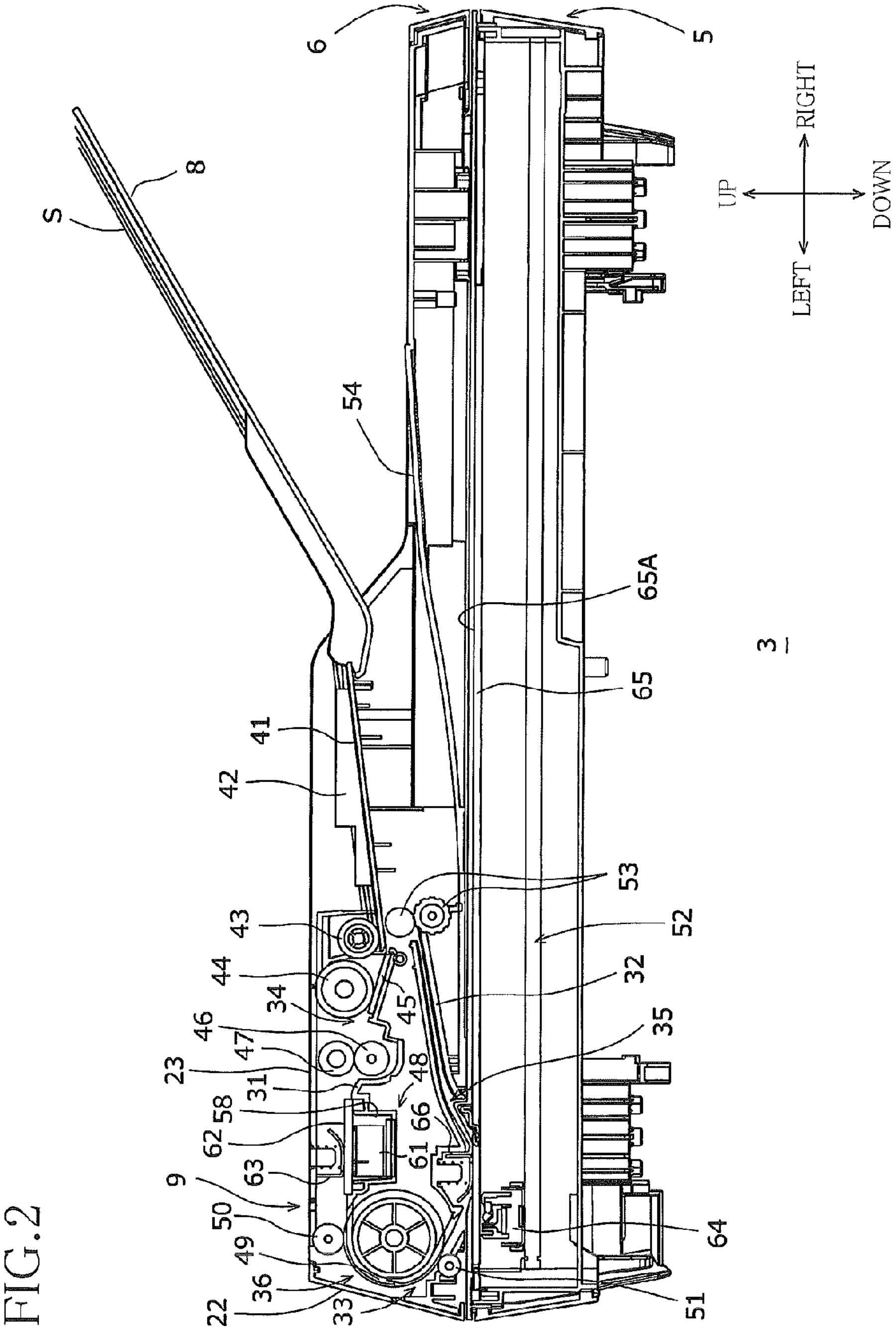
FIG. 2 is a cross-sectional view of the image reading device 3.
Figure 3:
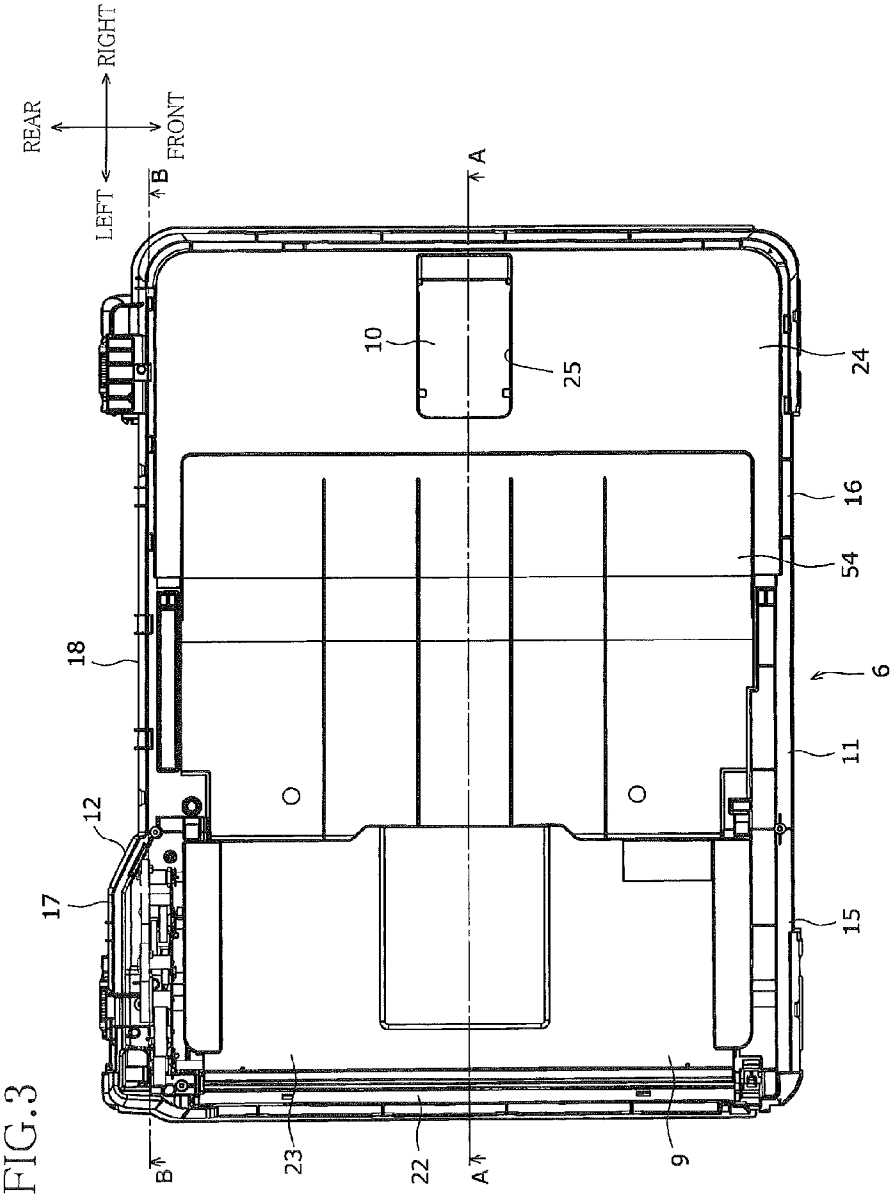
FIG. 3 is a plan view of the image reading device 3 in a state in which a tray 8 is removed.

The maintenance cover 9 is disposed so as to bridge the left-side portion 15 of the front plate 11 and the left-side portion 17 of the rear plate 12. The maintenance cover 9 is pivotable about a pivot axis 21 that extends in the front-rear direction between a lower left end of the left-side portion 15 and a lower left end of the left-side portion 17, such that the maintenance cover is selectively located at one of a covering position shown in FIG. 1 and a maintenance position. As shown in FIG. 2 in which the maintenance cover 9 is located at the covering position, the maintenance cover 9 includes: a side portion 22 that extends along left edges of the left-side portions 15, 17 and an upper portion 23 that extends from an upper end of the side portion 22 along upper edges of the left-side portions 15, 17. Each of the left-side portions 15, 17 is inclined such that a portion thereof nearer to the upper side is located more inward in the front-rear direction than the other portion thereof for the purpose of permitting the image reading device 3 to be seen as having a compact configuration. In a state in which the maintenance cover 9 is located at the maintenance position, the upper portion 23 of the maintenance cover extends substantially in the vertical direction.

The stopper 10 is disposed in a recess 25 formed in an upper surface 24 of the ADF unit 6. The stopper 10 is pivotable about a pivot axis that extends in the front-rear direction at a right end of the recess 25, such that the stopper 10 is selectively located at one of an accommodated position and a set position. At the accommodated position, the stopper 10 is accommodated within the recess 25. At the set position, the stopper 10 extends from the right end of the recess 25 to the upper right.

<Internal Structure>

As shown in FIG. 2, the ADF unit 6 includes an inner frame 31 and a lower frame 32.

The inner frame 31 is provided below the upper portion 23 of the maintenance cover 9 that is located at the covering position.

The lower frame 32 is provided below the inner frame 31. There is formed a space between an inner surface of the maintenance cover 9 and the inner frame 31, whereby a part of a conveyance path 33 through which a document S is conveyed is formed between the inner surface of the maintenance cover 9 and the inner frame 31. Further, there is formed a space between the inner frame 31 and the lower frame 32, whereby a part of the conveyance path 33 is formed between the inner frame 31 and the lower frame 32. The conveyance path 33 includes: an upper path 34 located relatively at an upper portion of the conveyance path 33; a lower path 35 located below the upper path 34; and a curved path 36 connecting the upper path 34 and the lower path 35. The upper path 34 is a space extending in the left-right direction between the inner surface of the maintenance cover 9 and the inner frame 31. The lower path 35 is a space extending in the left-right direction between the inner frame 31 and the lower frame 32. The curved path 36 is a space curved along a circumferential surface of a second LF roller 49 that will be later explained.

The image reading device 3 includes, along a conveyance direction of the document S in the conveyance path 33, the following components: a tray 41; a pair of widthwise guides 42; a supply roller 43; a separation roller 44; a separation member 45; a first LF roller 46; a first driven roller 47; a first reading portion 48; the second LF roller 49; a second driven roller 50; a third driven roller 51; a second reading portion 52; a pair of discharge rollers 53; and a tray 54. These components constitute a conveyor of the ADF unit 6.

The following explanation will be made based on a situation in which the maintenance cover 9 is located at the covering position, unless otherwise specified.

The tray 41 is disposed below a right end portion of the maintenance cover 9 with a space interposed therebetween. The tray 41 extends to the upper right. The document S as a target of image reading is to be placed across the tray 41 and the tray 8 located at the tray position.

The pair of widthwise guides 42 are provided on the tray 41. The widthwise guides 42 are opposed to each other in the front-rear direction. The widthwise guides 42 are configured to move toward and away from each other by the same amount with respect to a centerline therebetween. A distance between the widthwise guides 42 is adjusted in accordance with a width of the document S to be placed on an upper surface of the tray 41, namely, a dimension of the document S in the front-rear direction. The document S is inserted between the widthwise guides 42 form the right side. Thus, the document S is placed on the tray 41 such that a widthwise center of the document S aligns with a widthwise center of the tray 41.

The supply roller 43 is held so as to be rotatable about a rotation axis that extends in the front-rear direction between the left-side portion 15 of the front plate 11 and the left-side portion 17 of the rear plate 12. In the upper path 34, the supply roller 43 is in contact, at its circumferential surface, with a left end portion of the tray 41 from above.

The separation roller 44 is disposed on the left side of the supply roller 43. The separation roller 44 is held so as to be rotatable about a rotation axis that extends in the front-rear direction between the left-side portion 15 of the front plate 11 and the left-side portion 17 of the rear plate 12.

The separation member 45 is disposed below the separation roller 44. The separation member 45 is held by the inner frame 31. In the upper path 34, the separation member 45 is in elastic contact with a circumferential surface of the separation roller 44 from below.

The first LF roller 46 is disposed on the left side of the separation member 45. The first LF roller 46 is held so as to be rotatable about a rotation axis that extends in the front-rear direction between the left-side portion 15 of the front plate 11 and the left-side portion 17 of the rear plate 12.

The first driven roller 47 is disposed above the first LF roller 46. The first driven roller 47 is held so as to be rotatable about a rotation axis that extends in the front-rear direction between the left-side portion 15 of the front plate 11 and the left-side portion 17 of the rear plate 12. In the upper path 34, the first driven roller 47 is in contact, at its circumferential surface, with a circumferential surface of the first LF roller 46. The first driven roller 47 is configured to rotate by rotation of the first LF roller 46.

The first reading portion 48 includes a contact image sensor module 61, a contact glass 62, and a document pressing member 63.

The contact image sensor module 61 is disposed on the left side of the first LF roller 46. The contact image sensor module 61 is accommodated in a recess 58 that is formed in the inner frame 31 so as to be recessed downward. The contact image sensor module 61 extends in the front-rear direction in the recess 58. There are provided, in the contact image sensor module 61, an LED light source, a lens, an image sensor, and so on, for instance.

The contact glass 62 is provided over the contact image sensor module 61 so as to close the recess 58. An upper surface of the contact glass 62 faces the upper path 34.

The document pressing member 63 is disposed above the contact glass 62. The document pressing member 63 is supported by the maintenance cover 9. In the upper path 34, the document pressing member 63 is in elastic contact with the upper surface of the contact glass 62.

The second LF roller 49 is disposed at a left end portion of the inner frame 31. The second LF roller 49 is held so as to be rotatable about a rotation axis that extends in the front-rear direction between the left-side portion 15 of the front plate 11 and the left-side portion 17 of the rear plate 12.

The second driven roller 50 is disposed above the second LF roller 49. The second driven roller 50 is held so as to be rotatable about a rotation axis that extends in the front-rear direction between the left-side portion 15 of the front plate 11 and the left-side portion 17 of the rear plate 12. In the curved path 36, the second driven roller 50 is in contact, at its circumferential surface, with the circumferential surface of the second LF roller 49. The second driven roller 50 is configured to rotate by rotation of the second LF roller 49.

The third driven roller 51 is disposed on the lower left side of the second LF roller 49. The third driven roller 51 is held so as to be rotatable about a rotation axis that extends in the front-rear direction between the left-side portion 15 of the front plate 11 and the left-side portion 17 of the rear plate 12. In the curved path 36, the third driven roller 51 is in contact, at its circumferential surface, with the circumferential surface of the second LF roller 49. The third driven roller 51 is configured to rotate by rotation of the second LF roller 49.

The second reading portion 52 includes a contact image sensor module 64, a contact glass 65, and a document pressing member 66.

The contact image sensor module 64 is provided in the casing 5 so as to movable in the left-right direction. The contact image sensor module 64 extends in the front-rear direction. There are provided, in the contact image sensor module 64, an LED light source, a lens, an image sensor, and so on, for instance. The contact image sensor module 64 is located below a left end portion of the contact glass 65 when image reading utilizing the ADF unit 6 is performed, when the image reading device 3 is not used, and so on.

An upper surface of the contact glass 65 serves as a document placement surface 65A that is one example of a document placement surface. The contact glass 65 is provided at an upper portion of the casing 5. A stationary document that is to be read in a stationary state is placed on the document placement surface 65A.

The document pressing member 66 is disposed above the left end portion of the contact glass 65. The document pressing member 66 is elastically supported by the inner frame 31. In the lower path 35, the document pressing member 66 is in elastic contact with the upper surface of the contact glass 65.

The pair of discharge rollers 53, namely, an upper discharge roller 53 and a lower discharge roller 53, are disposed below a left end portion of the tray 41. The upper discharge roller 53 is disposed on the inner frame 31 while the lower discharge roller 53 is disposed on the lower frame 32. The pair of discharge rollers 53 are held so as to be rotatable about respective rotation axes that extend in the front-rear direction between the left-side portion 15 of the front plate 11 and the left-side portion 17 of the rear plate 12. In the lower path 35, the lower discharge roller 53 is in contact, at its circumferential surface, with a circumferential surface of the upper discharge roller 53. The lower discharge roller 53 is configured to rotate by rotation of the upper discharge roller 53.

The tray 54 is disposed below the tray 41. A left end portion of the tray 54 is located at a height level lower than that of an outlet of the lower path 35. The tray 54 extends to the upper right.

Figure 4:
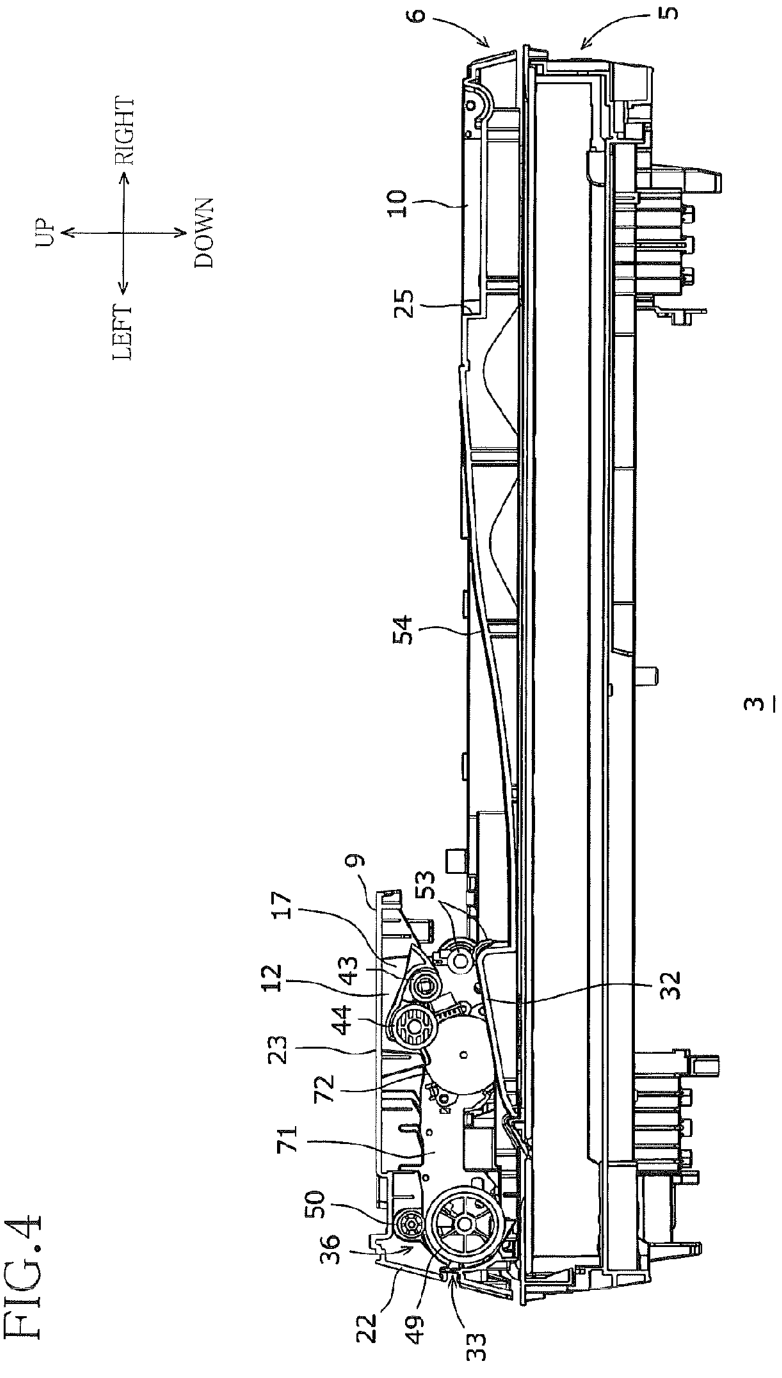
FIG. 4 is a cross-sectional view of the image reading device 3 taken along line A-A in FIG. 3, the view showing a state in which an inner frame 31 is removed.

As shown in FIG. 4, the image reading device 3 includes a drive frame 71 and a motor 72.

The drive frame 71 is formed of a sheet metal. The drive frame 71 is disposed on the front side of the left-side portion 17 of the rear plate 12.

The motor 72 is attached to the drive frame 71. A drive force generated by the motor 72 is transmitted, via a gear mechanism (not shown) supported by the drive frame 71, to the supply roller 43, the separation roller 44, the first LF roller 46, the second LF roller 49, and the upper discharge roller 53.

As described above, a drive mechanism including the drive frame 71 and the motor 72 is disposed at a position in the image reading device 3 that is near to the left side of the image reading device 3, so that the image reading device has a larger weight at its left side than at its right side.

<Hinge>

Figure 5:
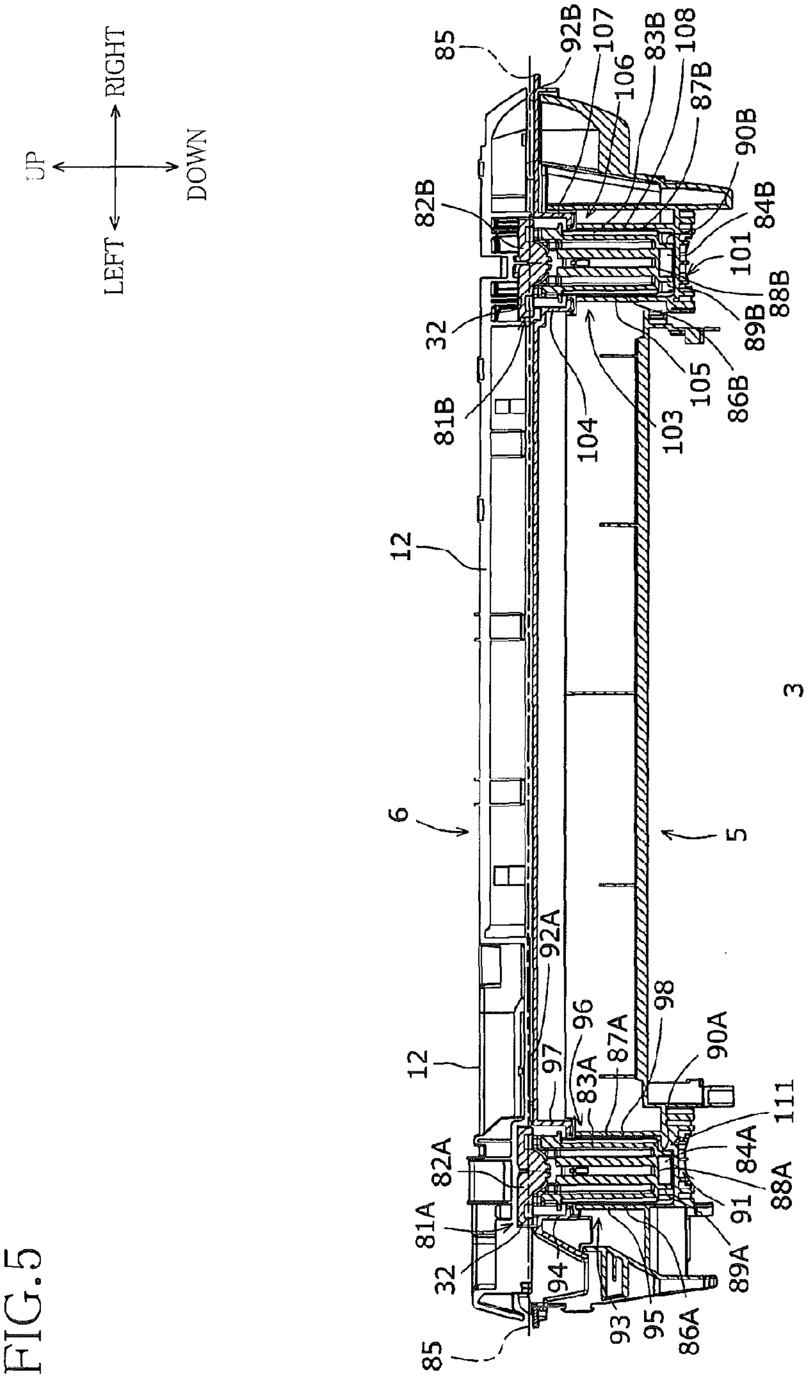
FIG. 5 is a cross-sectional view of the image reading device 3 taken along line B-B in FIG. 3.

As shown in FIG. 5, the image reading device 3 has two hinges 81A, 81B. The hinge 81A is provided at a rear left end portion of the image reading device 3 while the hinge 81B is provided at a rear right end portion of the image reading device 3.

The hinge 81A includes: an insert portion 83A and a protruding portion 84A which are one example of one end portion; and a shaft portion 82A as one example of the other end portion. The hinge 81B includes: an insert portion 83B and a protruding portion 84B which are one example of one end portion; and a shaft portion 82B as one example of the other end portion.

The shaft portion 82A extends in the left-right direction. The shaft portion 82A is attached to the lower frame 32 of the ADF unit 6. The shaft portion 82B extends in the left-right direction. The shaft portion 82B is attached to the lower frame 32 of the ADF unit 6. The shaft portion 82A of the hinge 81A and the shaft portion 82B of the hinge 81B are attached to the ADF unit 6, whereby the ADF unit 6 is pivotable about the shaft portion 82A and the shaft portion 82B, namely, pivotable about a center axis 85. The ADF unit 6 is configured to pivot between a covering position shown in FIG. 2 at which the ADF unit 6 covers the contact glass 65 and an exposure position at which the contact glass 65 is exposed.

The insert portion 83A extends downward from a substantially central portion, in the left-right direction, of the shaft portion 82A. The insert portion 83A has a left side surface 86A, a right side surface 87A, and a lower end surface 88A. Each of the left side surface 86A and the right side surface 87A is a flat surface extending in the up-down direction and the front-rear direction. The lower end surface 88A bridges a lower edge of the left side surface 86A and a lower edge of the right side surface 87A. The lower end surface 88A is a flat surface extending in the front-rear direction and the left-right direction. The insert portion 83B extends downward from a substantially central portion, in the left-right direction, of the shaft portion 82B. The insert portion 83B has a left side surface 86B, a right side surface 87B, and a lower end surface 88B. Each of the left side surface 86B and the right side surface 87B is a flat surface extending in the up-down direction and the front-rear direction. The lower end surface 88B bridges a lower edge of the left side surface 86B and a lower edge of the right side surface 87B. The lower end surface 88B is a flat surface extending in the front-rear direction and the left-right direction.

The protruding portion 84A protrudes downward from the lower end surface 88A of the insert portion 83A. The protruding portion 84A has a left side surface 89A and a right side surface 90A. Each of the left side surface 89A and the right side surface 90A is a flat surface extending in the up-down direction and the front-rear direction. The left side surface 89A is located on the right side of the left side surface 86A of the insert portion 83A. The right side surface 90A is located on the left side of the right side surface 87A of the insert portion 83A. The protruding portion 84B extends downward from the lower end surface 88B of the insert portion 83B. The protruding portion 84B has a left side surface 89B and a right side surface 90B. Each of the left side surface 89B and the right side surface 90B is a flat surface extending in the up-down direction and the front-rear direction. The left side surface 89B is located on the right side of the left side surface 86B of the insert portion 83B. The right side surface 90B is located on the left side of the right side surface 87B of the insert portion 83B.

The insert portion 83A and the protruding portion 84A of the hinge 81A are inserted in an insertion hole 91 formed in the casing 5. The insertion hole 91 is formed so as to be recessed downward from an upper surface 92A of a rear left end portion of the casing 5.

A left wall surface 93 of the insertion hole 91 includes: an upper wall surface portion 94 that extends downward from the upper surface 92A; and a lower wall surface portion 95 that extends in the up-down direction on the lower side of the upper wall surface portion 94. A right wall surface 96 of the insertion hole 91 includes: an upper wall surface portion 97 that extends downward from the upper surface 92A; and a lower wall surface portion 98 that extends in the up-down direction on the lower side of the upper wall surface portion 97. There is formed a space between the upper wall surface portion 94 and the upper wall surface portion 97 having a dimension in the left-right direction that is larger than a distance in the left-right direction between the left side surface 86A and the right side surface 87A of the insert portion 83A of the hinge 81A. Further, there is formed a space between the lower wall surface portion 95 and the lower wall surface portion 98 having a dimension in the left-right direction that is smaller than that of the space between the upper wall surface portions 94, 97 and that is larger than the distance in the left-right direction between the left side surface 86A and the right side surface 87A of the insert portion 83A of the hinge 81A.

The insert portion 83B and the protruding portion 84B of the hinge 81B are inserted in an insertion hole 101 formed in the casing 5. The insertion hole 101 is formed so as to be recessed downward from an upper surface 92B of a rear right end portion of the casing 5.

A left wall surface 103 of the insertion hole 101 includes: an upper wall surface portion 104 that extends downward from the upper surface 92B; and a lower wall surface portion 105 that extends in the up-down direction on the lower side of the upper wall surface portion 104. A right wall surface 106 of the insertion hole 101 includes: an upper wall surface portion 107 that extends downward from the upper surface 92B; and a lower wall surface portion 108 that extends in the up-down direction on the lower side of the upper wall surface portion 107. There is formed a space between the upper wall surface portion 104 and the upper wall surface portion 107 having a dimension in the left-right direction that is larger than a distance in the left-right direction between the left side surface 86B and the right side surface 87B of the insert portion 83B of the hinge 81B. Further, there is formed a space between the lower wall surface portion 105 and the lower wall surface portion 108 having a dimension in the left-right direction that is smaller than that of the space between the upper wall surface portions 104, 107 and that is larger than the distance in the left-right direction between the left side surface 86B and the right side surface 87B of the insert portion 83B of the hinge 81B.

In other words, the two hinges 81A, 81B are provided so as to be spaced apart from each other in the left-right direction, and a lower end portion of each of the two hinges 81A, 81B is inserted into the casing 5 movably in the up-down direction.

Figure 6:
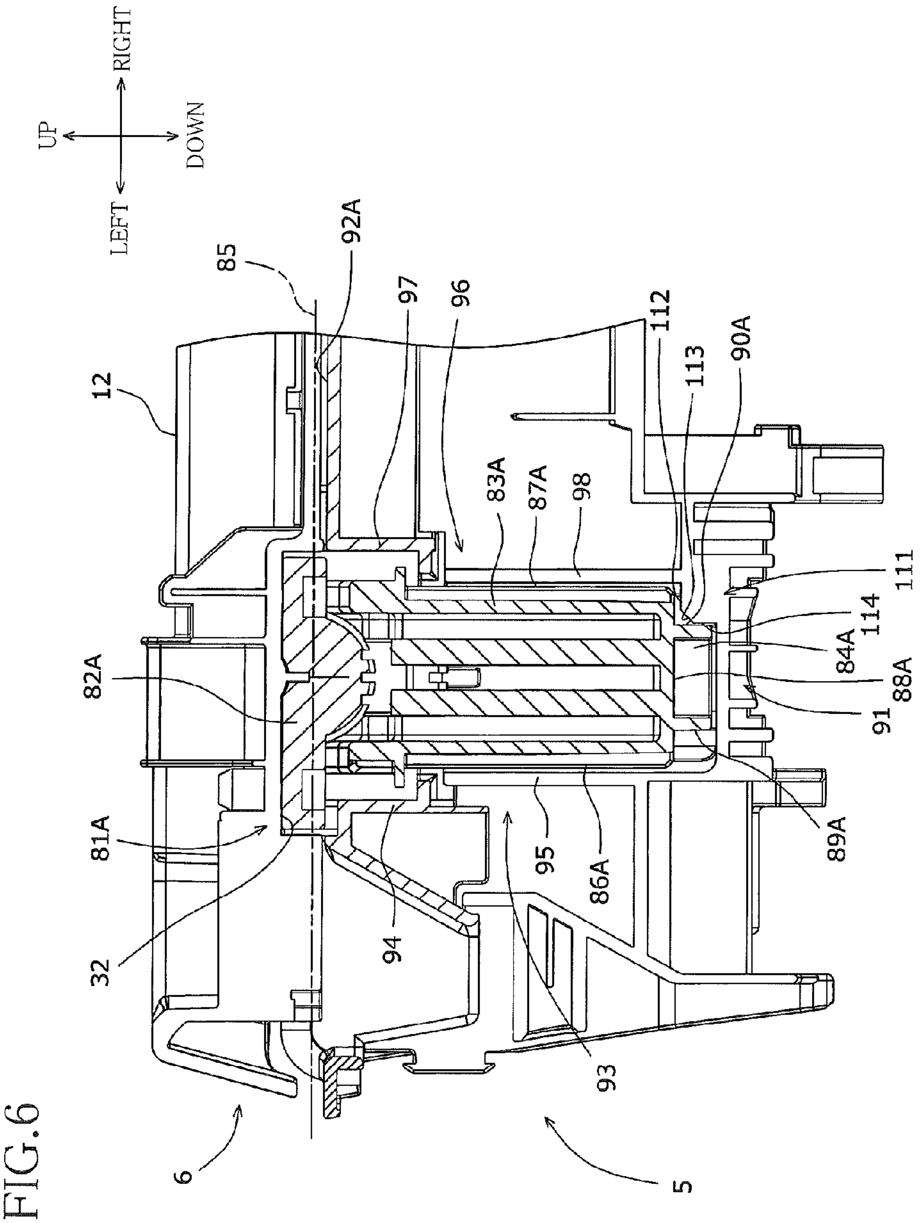
FIG. 6 is an enlarged view showing a vicinity of a hinge 81A in the cross-sectional view of the image reading device 3 shown in FIG. 5.

As shown in FIG. 6, the image reading device 3 has a contact member 111. The contact member 111 is provided at a right-side portion of the bottom of the insertion hole 91. The contact member 111 is formed integrally with the casing 5. The contact member 111 has an upper surface 112, an inclined surface 113 and a contact surface 114. The upper surface 112 extends leftward from the lower wall surface portion 98 of the right wall surface 96 of the insertion hole 91. The inclined surface 113 extends from a left edge of the upper surface 112 to the lower left. In other words, the inclined surface 113 is inclined such that a portion thereof on the right side is located at a higher level than the other portion thereof. More specifically, the inclined surface 113 is inclined so as to get closer to the document placement surface 65A toward the right side. The contact surface 114 extends downward from a left edge of the inclined surface 113. The contact surface 114 is configured to be capable of coming into contact with the right side surface 90A of the protruding portion 84A of the hinge 81A from the right side. The right side surface 90A is one example of a surface located on the inner side with which the contact member 111 is capable of coming into contact.

In the present specification, when focusing on one of the two hinges, “the inner side of the two hinges with respect to an arrangement of the two hinges in the axis direction” refers to one side of the one of the two hinges that is nearer to the other of the two hinges while “the outer side of the two hinges with respect to an arrangement of the two hinges in the axis direction” refers to another side of the one of the two hinges that is remote from the other of the two hinges. Concretely, when focusing on the left hinge, the inner side refers to the right side of the hinge while the outer side refers to the left side of the hinge. When focusing on the right hinge, the inner side refers to the left side of the hinge while the outer side refers to the right side of the hinge.

<Reading of Image of Sheet Document>

When an image of each of the documents S (sheet documents) is read utilizing the ADF unit 6, the tray 8 is opened so as to be located at the tray position and the maintenance cover 9 is closed so as to be located at the covering position, with the ADF unit 6 superposed on the casing 5 as shown in FIG. 2. As explained above, the documents S are placed on the tray 41 and the tray 8 such that the widthwise center of each document S aligns with the widthwise center of the tray 41. An upper surface and a lower surface of the document S in this state are referred to as a front surface and a back surface, respectively.

A leading end of each document S contacts the circumferential surface of the supply roller 43. When the supply roller 43 rotates clockwise as viewed from the front side, an uppermost one of the documents S on the tray 41 is fed between the separation roller 44 and the separation member 45 by a frictional force or the like between the upper surface of the uppermost document and the circumferential surface of the supply roller 43.

The separation roller 44 rotates clockwise as viewed from the front side. In an instance where the leading ends of the documents S get caught between the separation roller 44 and the separation member 45, the documents S are separated one by one, for instance, and the separated one document S passes between the separation roller 44 and the separation member 45 so as to be conveyed in the upper path 34.

The first LF roller 46 rotates counterclockwise as viewed from the front side. The first driven roller 47 rotates clockwise as viewed from the front side by rotation of the first LF roller 46. When the leading end of the document S that is conveyed in the upper path 34 reaches a contact point between the circumferential surface of the first LF roller 46 and the circumferential surface of the first driven roller 47, a conveyance force is applied from the first LF roller 46 and the first driven roller 47 to the document S.

Subsequently, the document S passes between the upper surface of the contact glass 62 and the document pressing member 63. On this occasion, the document S on the contact glass 62 is irradiated with a light emitted from the LED light source of the contact image sensor module 61. A reflected light that is reflected on the document S is received by an image sensor of the contact image sensor module 61, whereby an image on the back surface of the document S is read.

Thereafter, the leading end of the document S is fed from the upper path 34 to the curved path 36 by the conveyance force applied from the first LF roller 46 and the first driven roller 47. The second LF roller 49 rotates counterclockwise as viewed from the front side. The second driven roller 50 and the third driven roller 51 rotate clockwise as viewed from the front side. When the leading end of the document S reaches a contact point between the circumferential surface of the second LF roller 49 and the circumferential surface of the second driven roller 50, a conveyance force is applied from the second LF roller 49 and the second driven roller 50 to the document S. Subsequently when the leading end of the document S reaches a contact point between the circumferential surface of the second LF roller 49 and the circumferential surface of the third driven roller 51, a conveyance force is applied from the second LF roller 49 and the third driven roller 51 to the document S, whereby the document S is fed from the curved path 36 into the lower path 35.

The document S fed into the lower path 35 passes between the upper surface of the left end portion of the contact glass 65 and the document pressing member 66. On this occasion, the document S placed on the left end portion of the contact glass 65 is irradiated with a light emitted from the LED light source of the contact image sensor module 64. A reflected light that is reflected on the document S is received by an image sensor of the contact image sensor module 64, whereby an image on the front surface of the document S is read.

The upper discharge roller 53 rotates counterclockwise as viewed from the front side. The lower discharge roller 53 rotates clockwise as viewed from the front side by rotation of the upper discharge roller 53. When the leading end of the document S reaches a contact point between the circumferential surface of the upper discharge roller 53 and the circumferential surface of the lower discharge roller 53, a conveyance force is applied from the upper and lower discharge rollers 53 to the document S, so that the document S is discharged onto the tray 54.

<Reading of Image of Book Document>

When an image of a book document having a large thickness, e.g., a book B, is read, the user puts his/her fingers into the opening 26 with the ADF unit 6 superposed on the casing 5 and the front end portion of the ADF unit 6 is lifted up. As a result, the ADF unit 6 is opened such that the ADF unit 6 pivots upward about the center axis 85 of the shaft portion 82A and the shaft portion 82B while permitting each of the shaft portion 82A of the hinge 81A and the shaft portion 82B of the hinge 81B to function as a pivot center. When the ADF unit 6 is opened, the contact glass 65 is exposed.

Subsequently, the book B is opened and is placed on the contact glass 65 with its image-formed sheet surface facing downward.

Figure 7:
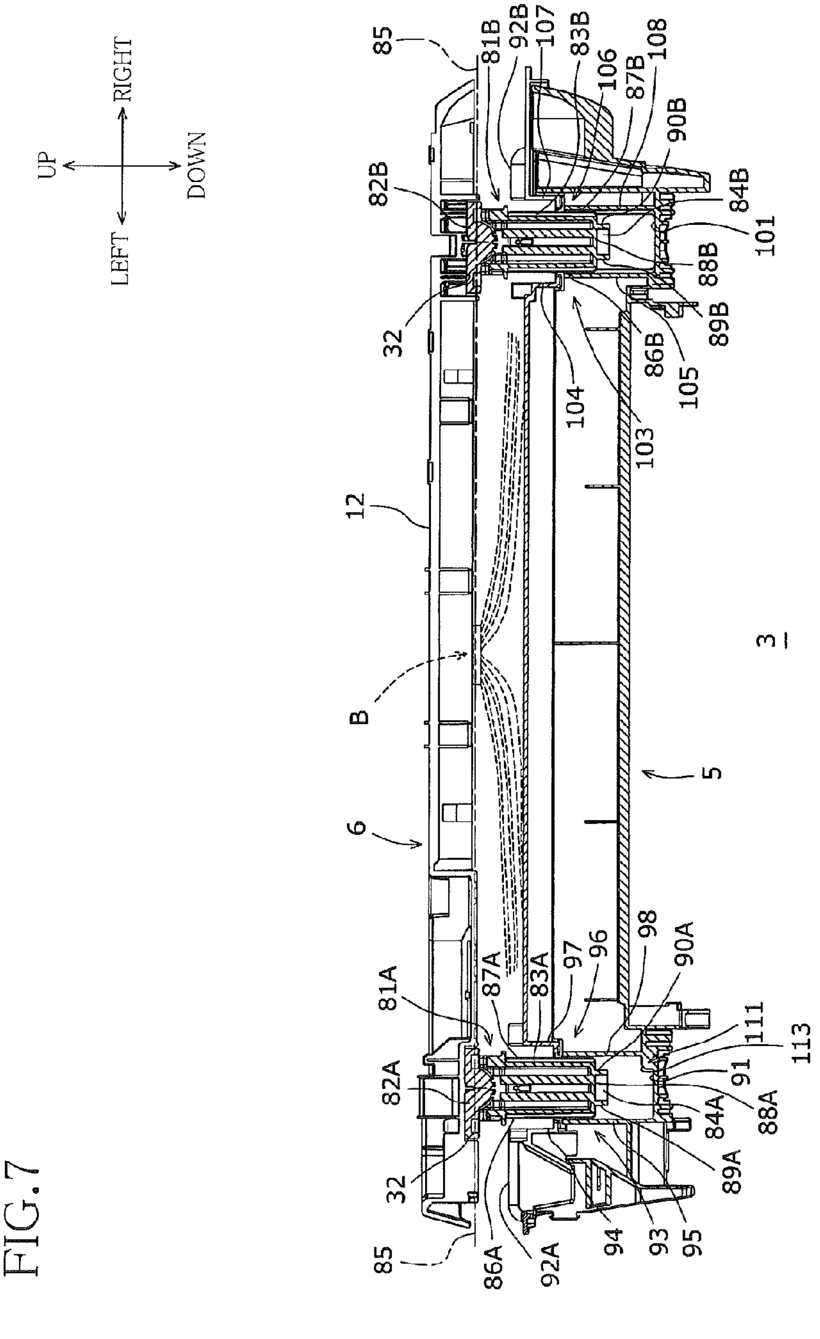
FIG. 7 is a cross-sectional view of the image reading device 3 taken along line B-B in FIG. 3, the view showing a state in which an image in a book B is read.

Thereafter, the front end portion of the ADF unit 6 is pulled down. As a result, the ADF unit 6 pivots downward about the center axis 85 of the shaft portion 82A and the shaft portion 82B while permitting each of is the shaft portion 82A of the hinge 81A and the shaft portion 82B of the hinge 81B to function as the pivot center, and the ADF unit 6 comes into contact with the book B. Subsequently when a downward force is applied to the front end portion of the ADF unit 6, the rear end portion of the ADF unit 6 moves upward together with the hinge 81A and the hinge 81B as shown in FIG. 7 while permitting a contact portion of the lower surface of the ADF unit 6 and the book B to function as a pivot center. Consequently, the lower surface of the ADF unit 6 becomes parallel with the contact glass 65, and the sheet surface of the book B is uniformly pressed onto the contact glass 65 by the ADF unit 6.

Subsequently when an operation for starting reading of the image is performed, the contact image sensor module 64 is moved at a constant speed from the left end portion to the right end portion of the contact glass 65. On this occasion, the sheet surface of the book B is irradiated with a light emitted from the contact image sensor module 64 through the contact glass 65. A reflected light that is reflected on the sheet surface is received by an image sensor of the contact image sensor module 64, whereby the image on the sheet surface is read.

Thereafter, the front end portion of the ADF unit 6 is lifted up, and the rear end portion of the ADF unit 6 moves downward together with the hinge 81A and the hinge 81B while permitting the contact portion between the lower surface of the ADF unit 6 and the book B to function as the pivot center. On this occasion, where the position of the hinge 81A in the left-right direction is shifted toward the right side from a normal position, the lower end of the protruding portion 84A comes into contact with the inclined surface 113 of the contact member 111. In this instance, the lower end of the protruding portion 84A moves along the inclined surface 113 in association with the downward movement of the hinge 81A, so that the position of the hinge 81A in the left-right direction returns back to the normal position and the protruding portion 84A is located on the left side of the contact surface 114 of the contact member 111. Further, the protruding portion 84A of the hinge 81A comes into contact with the bottom of the insertion hole 91 and the protruding portion 84B of the hinge 81B comes into contact with the bottom of the insertion hole 101. Thus, the movement of the rear end portion of the ADF unit 6 is completed.

After the book B has been removed from the contact glass 65, the ADF unit 6 pivots downward about the center axis 85 of the shaft portion 82A and the shaft portion 82B while permitting each of the shaft portion 82A of the hinge 81A and the shaft portion 82B of the hinge 81B to function as the pivot center, so that the ADF unit 6 returns back to the state in which the ADF unit 6 is superposed on the casing 5.

<Advantages>

As described above, the motor 72 is disposed at a position of the ADF unit 6 near to the left side of the ADF unit 6. Therefore, the ADF unit 6 has a larger weight on its left side than on its right side. That is, the ADF unit 6 has a weight distribution that permits a portion thereof on the right side (i.e., a right-side portion) to be readily moved earlier than a portion thereof on the left side (i.e., a left-side portion) when the ADF unit 6 pivots upward so as to be opened.

Even if a force for pivoting the ADF unit 6 is applied to the right-side portion of the ADF unit 6 when the ADF unit 6 pivots upward so as to be opened, it is possible to suppress the hinge 81A from being inclined with respect to the up-down direction since the contact surface 114 of the contact member 111 comes into contact with the hinge 81A. Accordingly, it is possible to suppress the ADF unit 6 from being inclined with respect to the left-right direction.

Further, even if the position of the hinge 81A in the left-right direction is shifted to the right side from the normal position in a state in which the hinge 81A is spaced apart from the contact member 111 in the up-down direction, the protruding portion 84A of the hinge 81A moves along the inclined surface 113 of the contact member 111 when the hinge 81A moves toward the contact member 111, so that the position of the hinge 81A in the left-right direction returns to the normal position. Therefore, it is possible to smoothly move the hinge 81A.

First Modification of the First Embodiment

Figure 8:
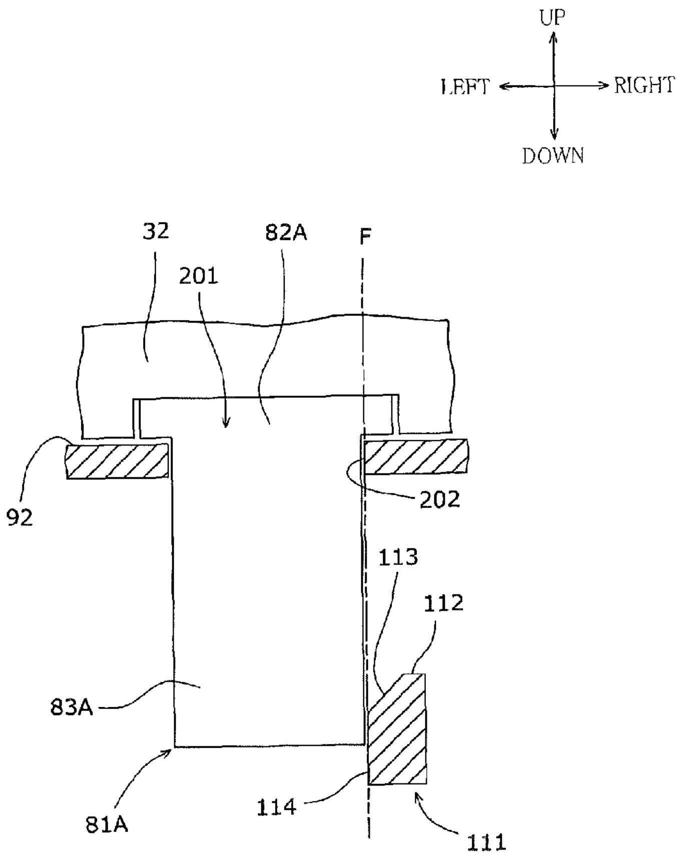
FIG. 8 is a view for explaining a first modification of the first embodiment.

For instance, the hinge 81A may be configured to have only the shaft portion 82A and the insert portion 83A without having the protruding portion 84A, as shown in FIG. 8.

With reference to FIG. 8, there will be explained a first modification of the illustrated first embodiment. In the first modification, an insertion opening 201 as one example of an insertion opening is formed in an upper surface 92 of the rear left end portion of the casing 5. The insert portion 83A of the hinge 81A is inserted into the insertion opening from above. A wall surface 202 that partially defines the insertion opening 201 on the right side (i.e., right wall surface 202 of the insertion opening 201) and the contact surface 114 are disposed on the same one plane F.

In the above arrangement, it is possible to suppress one of the right wall surface 202 of the insertion hole 201 and the contact surface 114 of the contact member 111 from coming into strong contact with the hinge 81A in a state in which the hinge 81A extends along the up-down direction. Accordingly, the hinge 81A can be more smoothly moved.

Second Modification of the First Embodiment

Figure 9:
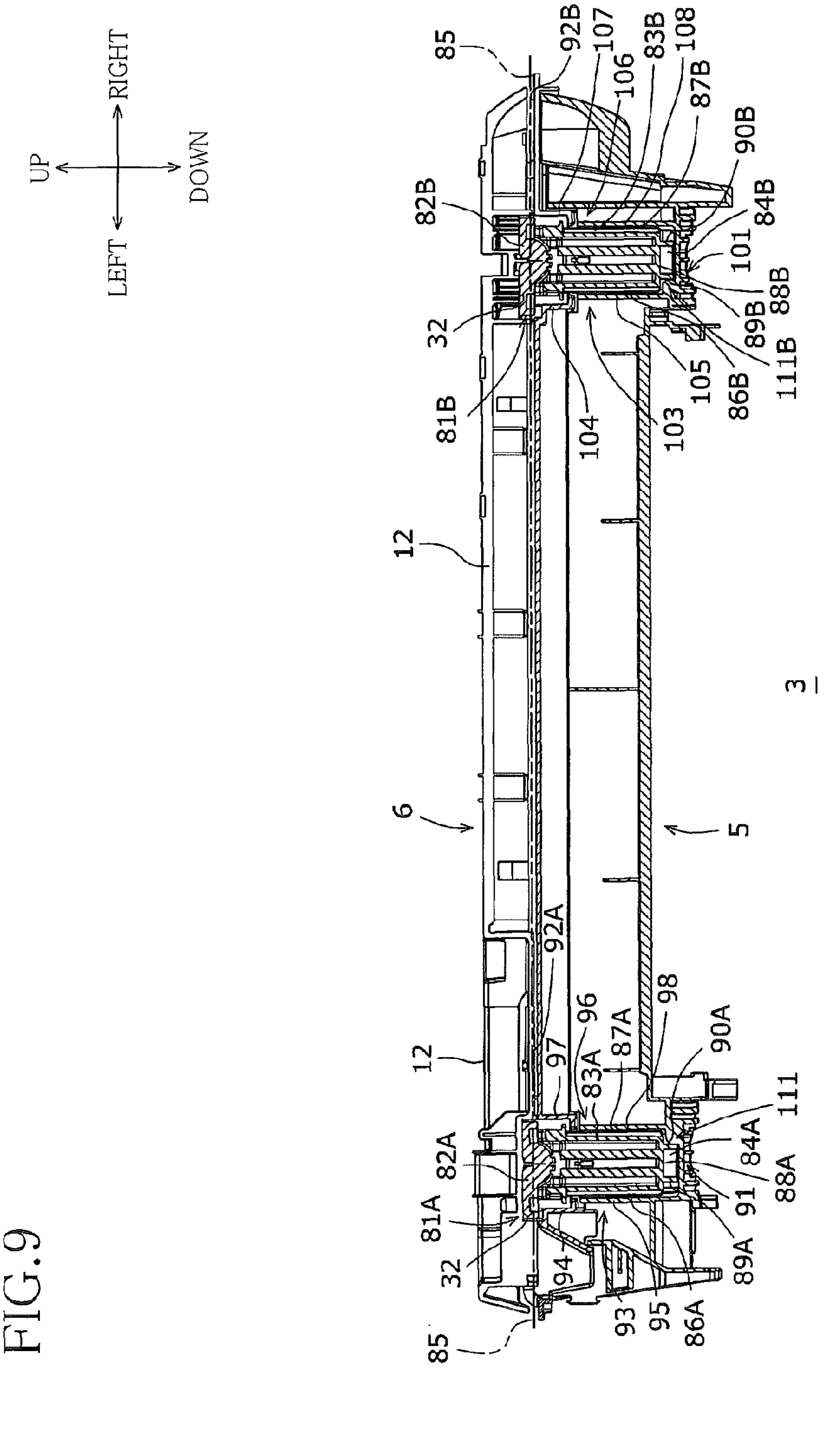
FIG. 9 is a cross-sectional view of an image reading device 3 for explaining a second modification of the first embodiment.
Figure 10:
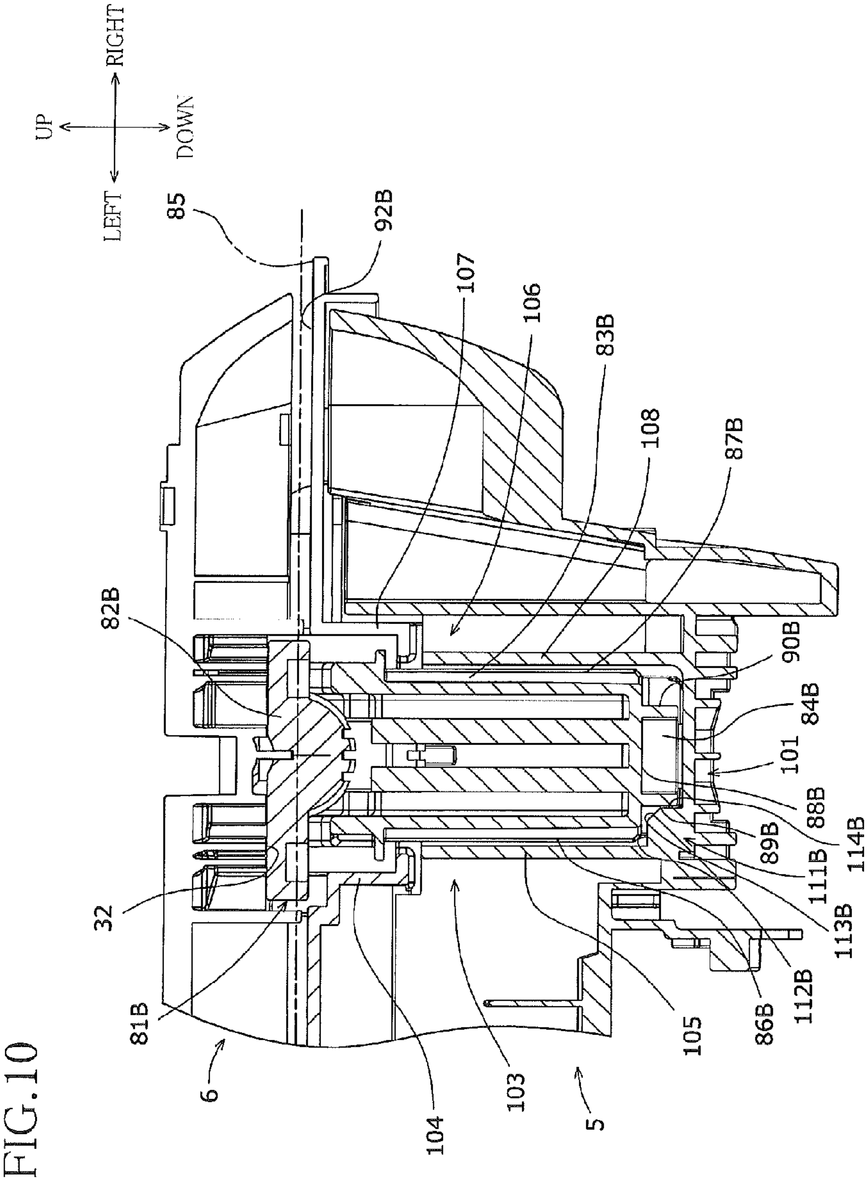
FIG. 10 is an enlarged view showing a vicinity of a hinge 81B in the cross-sectional view of the image reading device 3 shown in FIG. 9.

The image reading device 3 may include another contact member 111B, in addition to the contact member 111, as shown in FIG. 9. With reference to FIGS. 9 and 10, there will be explained a second modification of the illustrated first embodiment. The contact member 111B is provided at a left-side portion of the bottom of the insertion hole 101. The contact member 111B is formed integrally with the casing 5. As shown in FIG. 10, the contact member 111B has an upper surface 112B, an inclined surface 113B, and a contact surface 114B. The upper surface 112 extends rightward from the lower wall surface portion 105 of the left wall surface 103 of the insertion hole 101. The inclined surface 113B extends from a right edge of the upper surface 112B to the lower right. In other words, the inclined surface 113B is inclined such that a portion thereof on the left side is located at a higher level that the other portion thereof. More specifically, the inclined surface 113B is inclined so as to get closer to the document placement surface 65A toward the left side. The contact surface 114B extends downward from a right edge of the inclined surface 113B. The contact surface 114B is configured to be capable of coming into contact with the left side surface 89B of the protruding portion 84B of the hinge 81B from the left side. The left side surface 89B is one example of a surface of the inner side with which the contact member 111 is capable of coming into contact. In the arrangement, it is possible to suppress the hinge 81B from being inclined with respect to the up-down direction.

Second Embodiment

Figure 11:
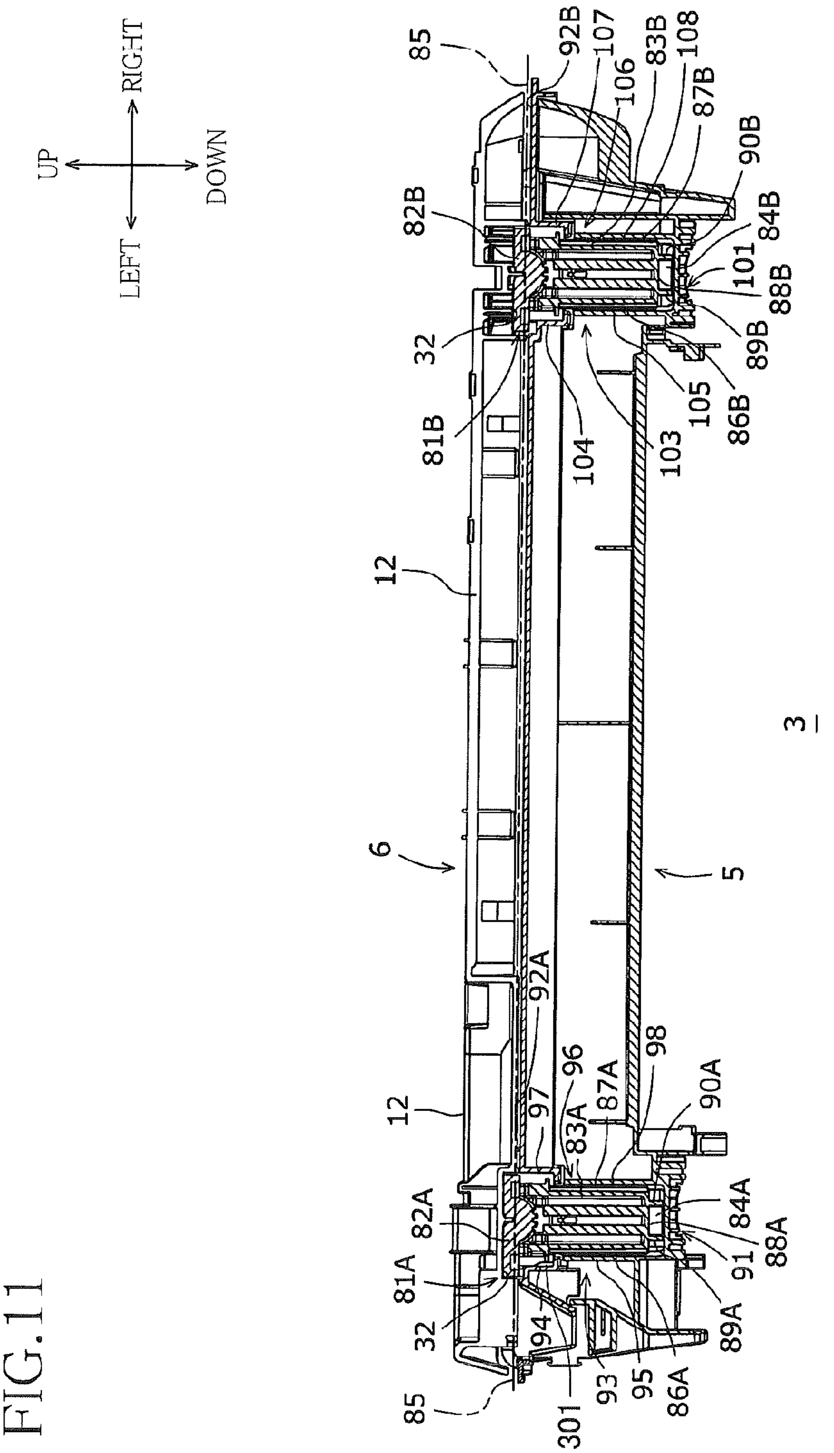
FIG. 11 is a cross-sectional view of an image reading device 3 according to a second embodiment of the invention.
Figure 12:
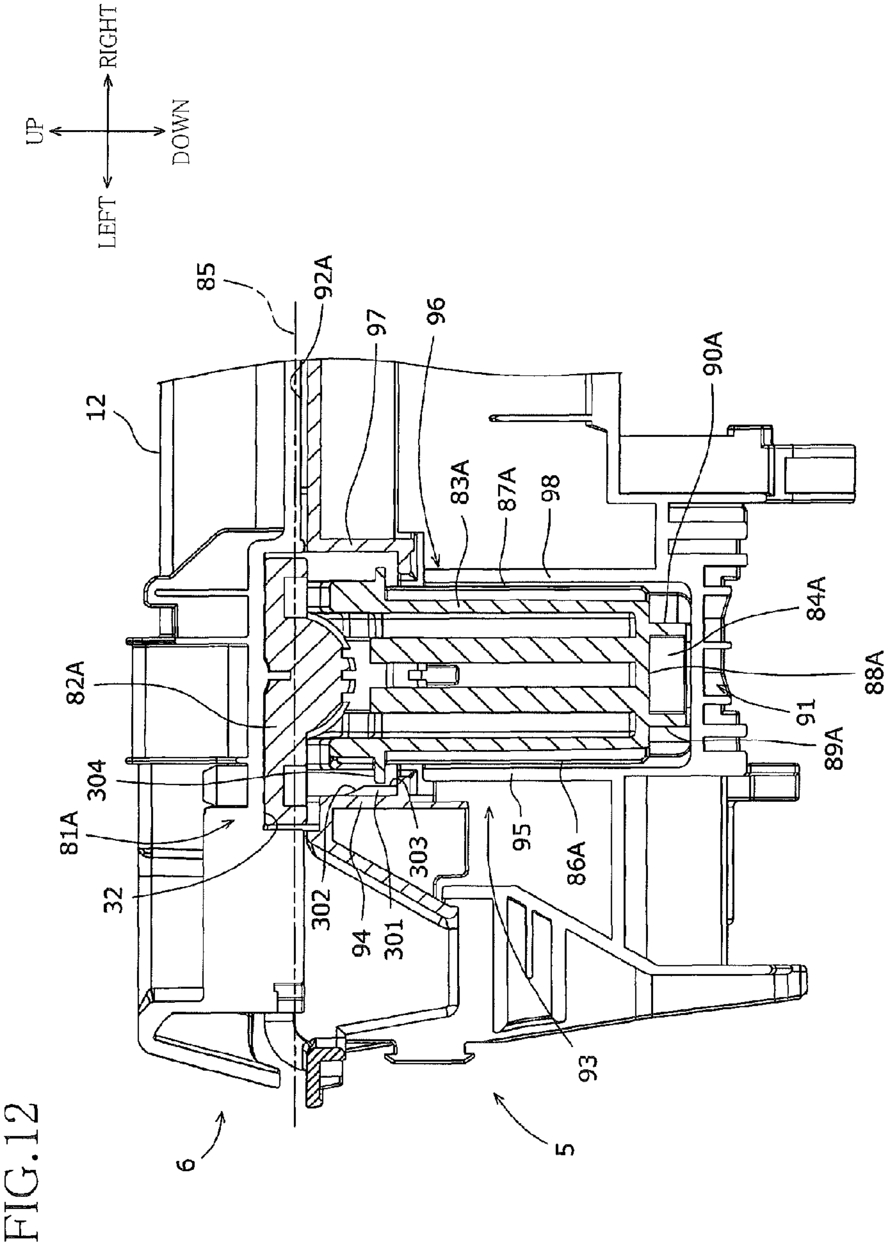
FIG. 12 is an enlarged view showing a vicinity of a hinge 81A in the cross-sectional view of the image reading device 3 shown in FIG. 11.

FIG. 11 is a cross-sectional view of an image reading device 3 according to a second embodiment of the present invention. FIG. 12 is an enlarged view showing a vicinity of the hinge 81A in the cross-sectional view of the image reading device 3 shown in FIG. 11.

In FIGS. 11 and 12, the same reference numerals as used in FIG. 5 are used to identify the corresponding components. In the following description, only structures in FIGS. 11 and 12 that differ from those in FIG. 5 will be explained.

The image reading device 3 in this second embodiment has a contact member 301, in place of the contact member 111 shown in FIG. 5. The contact member 301 is provided on the upper wall surface portion 94 of the left wall surface 93 of the insertion hole 91. The contact member 301 is formed integrally with the casing 5. As shown in FIG. 12, the contact member 301 has an inclined surface 302 and a contact surface 303. The inclined surface 302 extends to the lower right from a substantially middle, in the up-down direction, of the upper wall surface portion 94 of the left wall surface 103 of the insertion hole 91. The contact surface 303 extends downward from a right edge of the inclined surface 302.

The insert portion 83A of the hinge 81A has an extension 304. The extension 304 extends leftward from an upper portion of the left side surface 86A toward the contact surface 303 of the contact member 301.

In the above arrangement, even if the force for pivoting the ADF unit 6 is applied to the right-side portion of the ADF unit 6 when the ADF unit 6 pivots upward so as to be opened, it is possible to suppress the hinge 81A from being inclined with respect to the up-down direction since the contact surface 303 of the contact member 301 comes into contact with the extension 304 of the hinge 81A. Accordingly it is possible to suppress the ADF unit 6 from being inclined with respect to the left-right direction. In this respect, a surface of a leading end portion of the extension 304 of the hinge 81A is one example of a surface on the outer side with which the contact member 301 is capable of coming into contact.

Further, even if the position of the hinge 81A in the left-right direction is shifted to the left side from the normal position in a state in which the hinge 81A is spaced apart from the contact member 301 in the up-down direction, the extension 304 of the hinge 81A moves along the inclined surface 302 of the contact member 301 when the hinge 81A moves toward the contact member 301, so that the position of the hinge 81A in the left-right direction returns to the normal position. Therefore, it is possible to smoothly move the hinge 81A.

Because the contact member 301 is provided at a position near to an upper end of the insertion hole 91, the contact member 301 can be easily formed.

A portion of the left side surface 86A of the hinge 81A other than the extension 304 is located so as to be distant from the contact surface 303 of the contact member 301 toward the right side. Accordingly, it is possible to suppress the above-indicated portion of the left side surface 86A of the hinge 81A other than the extension 304 from coming into sliding and rubbing contact with the contact member 301 when the hinge 81A moves in the up-down direction. As a result, it is possible to obviate wear of the hinge 81A and the contact member 301 and occurrence of a sliding and rubbing noise.

Third Embodiment

Figure 13:
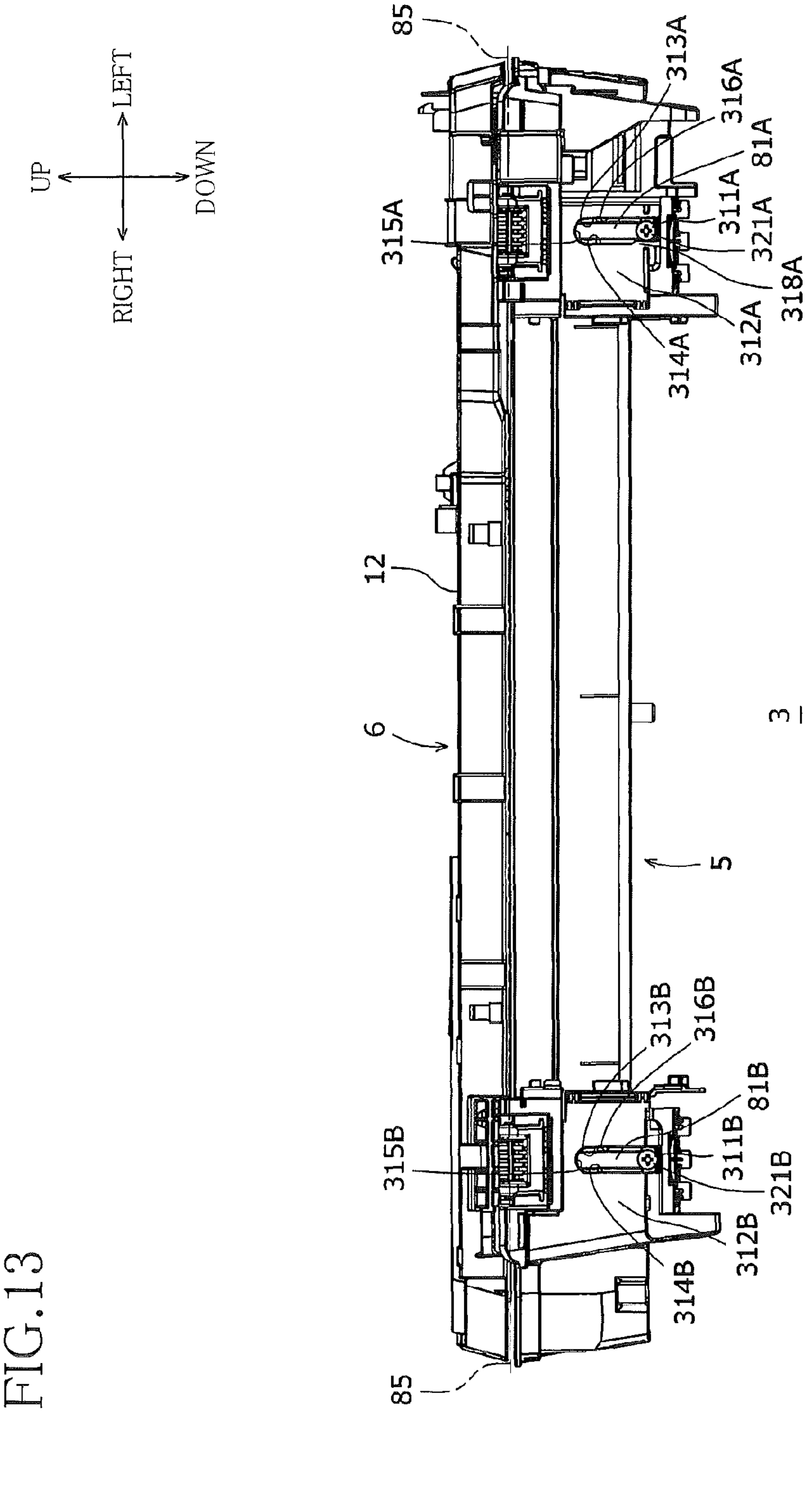
FIG. 13 is a rear view of an image reading device 3 according to a third embodiment of the invention.
Figure 14:
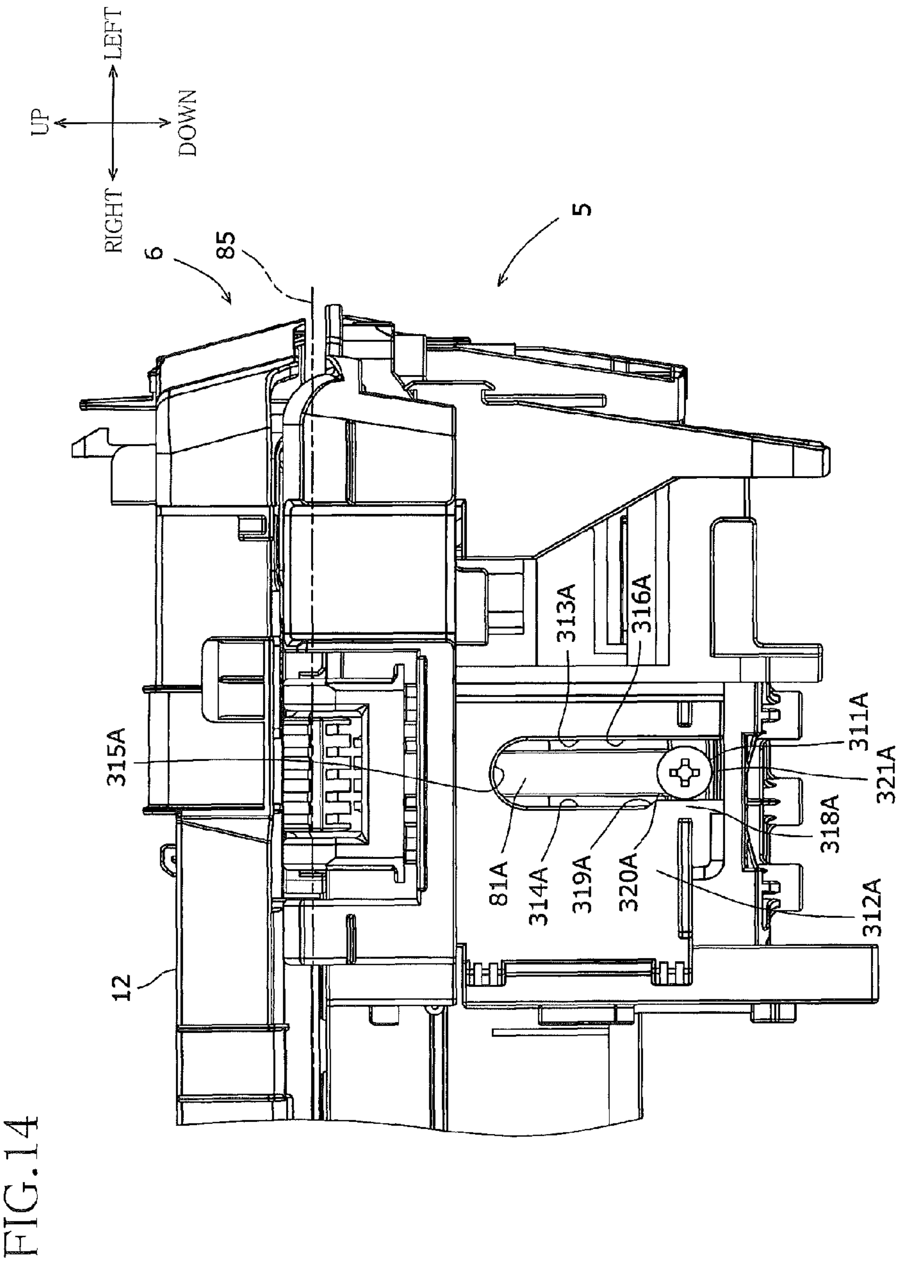
FIG. 14 is an enlarged view showing a vicinity of a hinge 81A in the rear view of the image reading device 3 shown in FIG. 13.

FIG. 13 is a rear view of an image reading device 3 according to a third embodiment of the invention. FIG. 14 is an enlarged view showing a vicinity of the hinge 81A in the rear view of the image reading device 3 shown in FIG. 13.

As shown in FIG. 13, coming-off prevention screws 311A, 311B are screwed into lower ends of rear surfaces of the respective hinges 81A, 81B from the rear side. Each of the coming-off prevention screws 311A, 311B is one example of a protrusion that protrudes in a direction perpendicular to both of the left-right direction (as one example of an axis direction) and the up-down direction (as one example of a movement direction).

The casing 5 includes rear plate portions 312A, 312B. The rear plate portions 312A, 312B are disposed on the back side of the respective hinges 81A, 81B. In the rear plate portions 312A, 312B, there are formed respective grooves 316A, 316B opening downward, through the thickness of the rear plate portions 312A, 312B in the front-rear direction.

By provision of the groove 316A, the rear plate portion 312A includes a first surface portion 313A, a second surface portion 314A, and a third surface portion 315A. The first surface portion 313A extends upward from a lower end of the rear plate portion 312A. The second surface portion 314A extends on the right side of the first surface portion 313A with a space interposed therebetween, the space being larger than a diameter of a head 321A of the coming-off prevention screw 311A. The second surface portion 314A extends in the up-down direction so as to be in parallel with the first surface portion 313A. The third surface portion 315A is connected to an upper end of the first surface portion 313A and an upper end of the second surface portion 314A and has a semi-circular arc shape protruding upward.

By provision of the groove 316B, the rear plate portion 312B includes a first surface portion 313B, a second surface portion 314B, and a third surface portion 315B. The first surface portion 313B extends upward from a lower end of the rear plate portion 312B. The second surface portion 314B extends on the right side of the first surface portion 313B with a space interposed therebetween, the space being larger than a diameter of a head 321B of the coming-off prevention screw 311B. The second surface portion 314B extends in the up-down direction so as to be parallel with the first surface portion 313B. The third surface portion 315B is connected to an upper end of the first surface portion 313B and an upper end of the second surface portion 314B and has a semi-circular arc shape protruding upward.

As shown in FIG. 14, the image reading device 3 in this third embodiment has a contact member 318A. The contact member 318A is formed integrally with the rear plate portion 312A. The contact member 318A has an inclined surface 319A and a contact surface 320. The inclined surface 319A extends from a lower end of the second surface portion 314A to the lower left. The contact surface 320 extends downward from a left edge of the inclined surface 319A to the lower end of the rear plate portion 312A.

The head 321A of the coming-off prevention screw 311A is located in the groove 316A while the head 321B of the coming-off prevention screw 311B is located in the groove 316B. In a state in which the hinges 81A, 81B are located at the most downward position, the head 321A of the coming-off prevention screw 311A is in contact with the contact surface 320 of the contact member 318A from the left side. In this respect, a part of a circumferential surface of the head 321A of the coming-off prevention screw 311A is one example of a surface on the inner side with which the contact member 318A is capable of coming into contact.

In the above arrangement, when the ADF unit 6 is lifted upward with respect to the casing 5 and the hinges 81A, 81B are moved upward, the coming-off prevention screws 311A, 311B come into contact with the third surface portions 315A, 315B, respectively, thereby preventing the hinges 81A, 81B to be further moved. Accordingly, it is possible to prevent the hinges 81A, 81B from coming off from the respective insertion holes 91, 101.

The contact surface 320 is configured to be capable of coming into contact with the head 321A of the coming-off prevention screw 311A from the right side. Accordingly, even if the force for pivoting the ADF unit 6 is applied to the right-side portion of the ADF unit 6 when the ADF unit 6 pivots upward so as to be opened, it is possible to suppress the hinge 81A from being inclined with respect to the up-down direction since the contact surface 320 of the contact member 318A comes into contact with the head 321A of the coming-off prevention screw 311A. It is therefore possible to suppress the ADF unit 6 from being inclined with respect to the left-right direction.

Further, even the position of the hinge 81A in the left-right direction is shifted to the right side from the normal position in a state in which the hinge 81A is spaced apart from the contact member 318 in the up-down direction, the head 321A of the coming-off prevention screw 311A of the hinge 81A moves along the inclined surface 319A of the contact member 318A when the hinge 81A moves toward the contact member 318A, so that the position of the hinge 81A in the left-right direction returns to the normal position. Therefore, it is possible to smoothly move the hinge 81A.

Modification of the Third Embodiment

Figure 15:
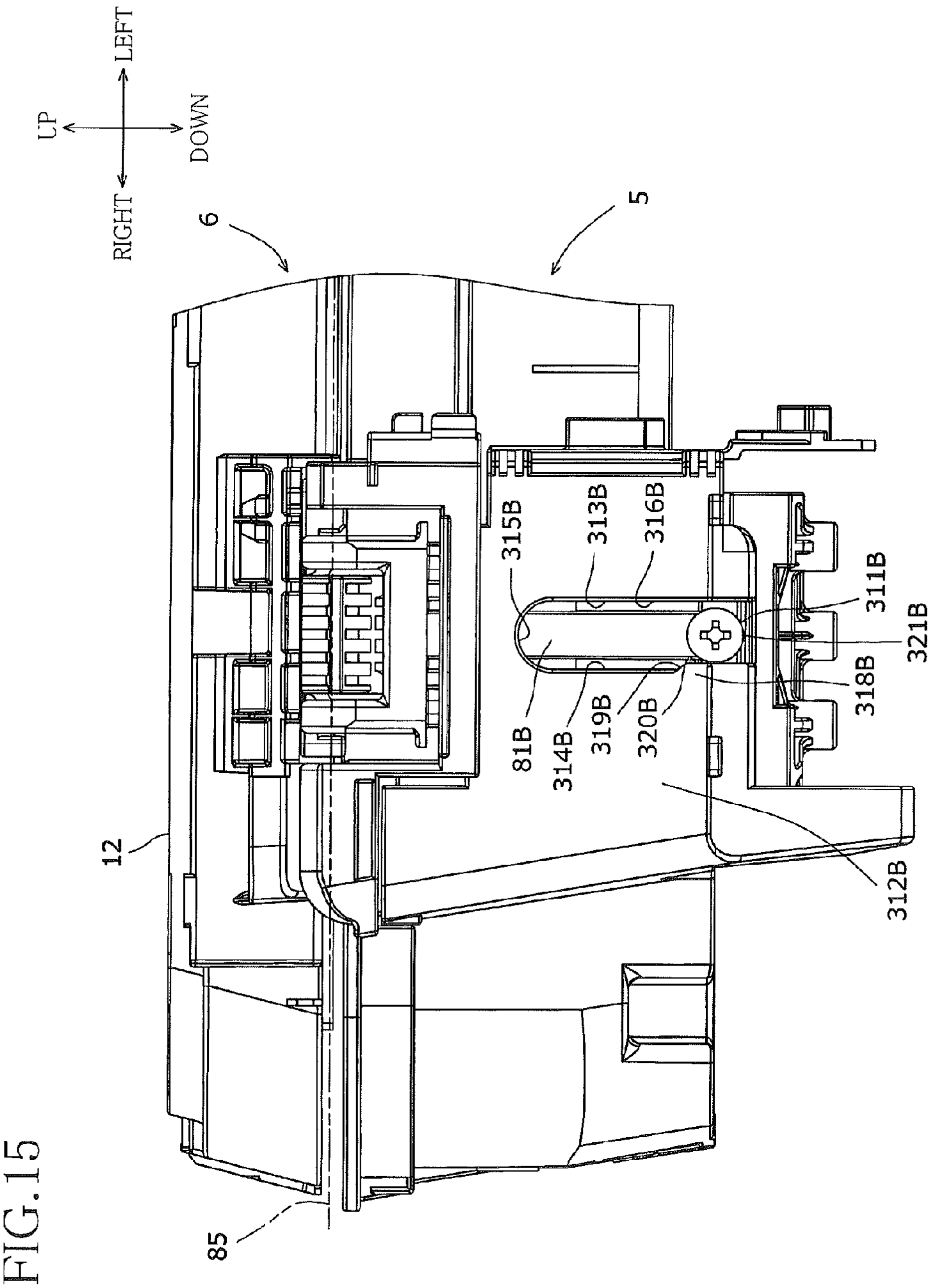
FIG. 15 is an enlarged view showing a vicinity of a hinge 81B in the rear view of the image reading device 3 shown in FIG. 13.

The image reading device 3 may have another contact member 318B shown in FIG. 15, in addition to the contact member 318A. With reference to FIG. 15. there will be explained a modification of the illustrated third embodiment.

The contact member 318B is formed integrally with the rear plate portion 312B. The contact member 318B has an inclined surface 319B and a contact surface 320B. The inclined surface 319B extends from a lower end of the second surface portion 314B to the lower left. The contact surface 320B extends downward from a left edge of the inclined surface 319B to the lower end of the rear plate portion 312B.

In a state in which the hinges 81A, 81B are located at the most downward position, the head 321B of the coming-off prevention screw 311B is in contact with the contact surface 320B of the contact member 318B from the left side. In other words, the contact surface 320B is in contact with the head 321B of the coming-off prevention screw 311B from the right side. In this respect, a part of a circumferential surface of the head 321B of the coming-off prevention screw 311B is one example of a surface on the outer side with which the contact member 318B is capable of coming into contact.

In the above arrangement, even if the force for pivoting the ADF unit 6 is applied to the right-side portion of the ADF unit 6 when the ADF unit 6 pivots upward so as to opened, it is possible to suppress the hinge 81B from being inclined with respect to the up-down direction since the contact surface 320B of the contact member 318B comes into contact with the head 321B of the coming-off prevention screw 311B. Accordingly, it is possible to suppress the ADF unit 6 from being inclined with respect to the left-right direction.

The coming-off prevention screws 311A, 311B may be separably or inseparably provided with respect to the respective hinges 81A, 81B. Further, members having structures similar to those of the respective coming-off prevention screws 311A, 311B may be formed integrally with the corresponding hinges 81A, 81B.

It is to be understood that the present invention may be embodied with other changes and modifications without departing from the scope of the invention defined in the attached claims.

What is claimed is:

1. An image reading device, comprising:

a casing having a document placement surface on which a document is to be placed;

a cover provided on the casing and configured to be pivotable relative to the casing about an axis between a covering position at which the cover covers the document placement surface and an exposure position at which the document placement surface is exposed;

two hinges provided so as to be spaced apart from each other in an axis direction in which the axis extends, one end portion of each of the two hinges being inserted into the casing movably in a movement direction perpendicular to the document placement surface while the other end portion is connected to the cover; and a contact member configured to come into contact with a surface of one of the two hinges in the axis direction, the surface, with which the contact member is configured to come into contact, being located on an inner side of the one of the two hinges, wherein the contact member has an inclined surface that becomes closer to the document placement surface toward the inner side.

2. The image reading device according to claim 1, comprising another contact member configured to come into contact with the other of the two hinges in the axis direction.

3. The image reading device according to claim al, wherein the casing has an insertion opening into which the one of the two hinges is inserted, and wherein a wall surface that partially defines the insertion opening on the inner side and a portion of the contact member that is capable of coming into contact with the one of the two hinges are disposed on a same plane.

4. The image reading device according to claim 1, wherein the one of the two hinges has a protrusion that protrudes in a direction perpendicular to both of the axis direction and the movement direction, and wherein the contact member is configured to come into contact with the protrusion from the inner side.

5. The image reading device according to claim 1, wherein the cover has a greater weight on one side thereof than another side thereof in the axis direction, and wherein the contact member is configured to come into contact with the one of the two hinges that is disposed on the one side.

6. The image reading device according to claim 1, wherein the contact member has a contact surface that extends in the movement direction and that is capable of coming into contact with the one of the two hinges.

7. An image reading device, comprising:

a casing having a document placement surface on which a document is to be placed;

an automatic document supply unit provided on the casing and configured to be pivotable relative to the casing about an axis between a covering position at which the automatic document supply unit covers the document placement surface and an exposure position at which the document placement surface is exposed;

two hinges provided so as to be spaced apart from each other in an axis direction in which the axis extends, one end portion of each of the two hinges being inserted into the casing movably in a movement direction perpendicular to the document placement surface while the other end portion is connected to the automatic document supply unit; and a contact member disposed at a position located between the two hinges with respect to an arrangement of the two hinges in the axis direction, wherein the automatic document supply unit has a conveyor configured to convey a document and a motor disposed at a position near one side of the automatic document supply unit in the axis direction and configured to generate a drive force for the conveyor, and wherein the contact member has: a contact surface that is capable of coming into contact with one of the two hinges that is disposed on the one side of the automatic document supply unit; and an inclined surface that becomes closer to the document placement surface toward another side of the automatic document supply unit that is opposite to the one side in the axis direction.

8. An image reading device, comprising:

a casing having a document placement surface on which a document is to be placed;

an automatic document supply unit provided on the casing and configured to be pivotable relative to the casing about an axis between a covering position at which the automatic document supply unit covers the document placement surface and an exposure position at which the document placement surface is exposed;

two hinges provided so as to be spaced apart from each other in an axis direction in which the axis extends, one end portion of each of the two hinges being inserted into the casing movably in a movement direction perpendicular to the document placement surface while the other end portion is connected to the automatic document supply unit; and a contact member that is disposed at a position located on an outer side of the two hinges with respect to an arrangement of the two hinges in the axis direction, wherein the automatic document supply unit has a conveyor configured to convey a document and a motor disposed at a position near to one side of the automatic document supply unit in the axis direction and configured to generate a drive force for the conveyor, wherein one of the two hinges that is disposed on the one side of the automatic document supply unit has an extension that extends toward the outer side, so as to be opposed to the contact member, and wherein the contact member has: a contact surface that is capable of coming into contact with the extension; and an inclined surface that becomes closer to the document placement surface toward the one side of the automatic document supply unit.

9. An image reading device, comprising:

a casing having a document placement surface on which a document is to be placed;

an automatic document supply unit provided on the casing and configured to be pivotable relative to the casing about an axis between a covering position at which the automatic document supply unit covers the document placement surface and an exposure position at which the document placement surface is exposed;

two hinges provided so as to be spaced apart from each other in an axis direction in which the axis extends, one end portion of each of the two hinges being inserted into the casing movably in a movement direction perpendicular to the document placement surface while the other end portion is connected to the automatic document supply unit; and a contact member that is disposed at a position located between the two hinges with respect to an arrangement of the two hinges in the axis direction, wherein the automatic document supply unit has a conveyor configured to convey a document and a motor disposed at a position near to one side of the automatic document supply unit in the axis direction and configured to generate a drive force for the conveyor, wherein one of the two hinges that is disposed on the one side of the automatic document supply unit has a protrusion that protrudes in a direction perpendicular to both of the axis direction and the movement direction, and wherein the contact member has: a contact surface that is capable of coming into contact with the protrusion; and an inclined surface that becomes closer to the document placement surface toward another side of the automatic document supply unit that is opposite to the one side in the axis direction.

10. An image reading device, comprising:

a casing having a document placement surface on which a document is to be placed;

a cover provided on the casing and configured to be pivotable with relative to the casing about an axis between a covering position at which the cover covers the document placement surface and an exposure position at which the document placement surface is exposed;

two hinges provided so as to be spaced apart from each other in an axis direction in which the axis extends, one end portion of each of the two hinges being inserted into the casing movably in a movement direction perpendicular to the document placement surface while the other end portion is connected to the cover; and a contact member configured to come into contact with a surface of one of the two hinges in the axis direction, the surface being located on an outer side of the one of the two hinges, wherein the contact member has an inclined surface that becomes closer to the document placement surface toward the outer side.

11. The image reading device according to claim 10, wherein the one of the two hinges has an extension that extends toward the outer side so as to be opposed to the contact member.

12. The image reading device according to claim 10, wherein the one of the two hinges has a protrusion that protrudes in a direction perpendicular to both of the axis direction and the movement direction, and wherein the contact member is configured to come into contact with the protrusion from the outer side.

13. The image reading device according to claim 10, wherein the cover has a greater weight on one side thereof than another side thereof in the axis direction, and wherein the contact member is configured to come into contact with the one of the two hinges that is disposed on the one side.

* * * * *